(12) United States Patent
Radhakrishnan et al.

(10) Patent No.: US 11,451,061 B2
(45) Date of Patent: Sep. 20, 2022

(54) RECONFIGURATION OF POWER GRIDS DURING ABNORMAL CONDITIONS USING RECLOSERS AND DISTRIBUTED ENERGY RESOURCES

(71) Applicant: Battelle Memorial Institute, Richland, WA (US)

(72) Inventors: Nikitha Radhakrishnan, Richland, WA (US); Jacob Hansen, Seattle, WA (US); Saptarshi Bhattacharya, Richland, WA (US); Kevin P. Schneider, Seattle, WA (US); Bishnu P. Bhattarai, Kennewick, WA (US); Wei Du, Richland, WA (US); Md Jan E Alam, Richland, WA (US); Abhishek Somani, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 91 days.

(21) Appl. No.: 16/673,781

(22) Filed: Nov. 4, 2019

(65) Prior Publication Data
US 2020/0144823 A1 May 7, 2020

Related U.S. Application Data

(60) Provisional application No. 62/754,792, filed on Nov. 2, 2018.

(51) Int. Cl.
*H02J 3/38* (2006.01)
*G05B 15/02* (2006.01)
(Continued)

(52) U.S. Cl.
CPC ............ *H02J 3/381* (2013.01); *G05B 15/02* (2013.01); *H02J 3/18* (2013.01); *H02J 13/0017* (2013.01); *H02J 2203/20* (2020.01)

(58) Field of Classification Search
CPC .......... H02J 3/381; H02J 13/0017; H02J 3/18; H02J 2203/20; H02J 2300/24;
(Continued)

(56) References Cited

U.S. PATENT DOCUMENTS 4,010,614 A 3/1977 Arthur
5,572,438 A 11/1996 Ehlers et al.
(Continued)

OTHER PUBLICATIONS

Abb, Volt-VAr management solutions for Smart Grid Distribution Automation Applications, document dated Apr. 2013, 12 pages.
(Continued)

*Primary Examiner* — Thomas C Lee
*Assistant Examiner* — Anzuman Sharmin
(74) *Attorney, Agent, or Firm* — Klarquist Sparkman, LLP

(57) ABSTRACT

Apparatus and methods are disclosed for restoring operation of a power grid comprising a plurality of reclosers and distributed energy resources (DERs) responsive to abnormal conditions by determining and implementing a reconfiguration for the power grid. The reconfiguration can specify respective new statuses for one or more of the reclosers and/or respective quantities of reactive power to be supplied by one or more of the DERs. The reconfiguration can be determined based on a plurality of constraints using an objective function, the constraints being determined based at least in part on recloser status data and/or DER power generation capability data. Respective cleared quantities of reactive power for the DERs to supply to the reconfigured power grid can be determined via a transactive control scheme, and the reconfiguration can be updated prior to implementation based on the results of the transactive control scheme.

19 Claims, 13 Drawing Sheets

(51) Int. Cl.
*H02J 3/18* (2006.01)
*H02J 13/00* (2006.01)

(58) Field of Classification Search
CPC ............. H02J 2300/40; H02J 13/00004; H02J 13/0004; G05B 15/02; Y02E 40/70; Y02E 40/30; Y02E 10/56; Y04S 10/123; Y04S 10/22

See application file for complete search history.

(56) References Cited

U.S. PATENT DOCUMENTS

| | | |
|---|---|---|
| 5,684,710 A | 11/1997 | Ehlers et al. |
| 5,696,695 A | 12/1997 | Ehlers et al. |
| 5,924,486 A | 7/1999 | Ehlers et al. |
| 6,119,052 A * | 9/2000 | Guenther ............... B65H 5/228 |
| | | 271/194 |
| 6,216,956 B1 | 4/2001 | Ehlers et al. |
| 6,343,277 B1 | 1/2002 | Gaus et al. |
| 6,633,823 B2 | 10/2003 | Bartone et al. |
| 6,681,156 B1 | 1/2004 | Weiss |
| 6,895,325 B1 | 5/2005 | Munson, Jr. |
| 6,963,854 B1 | 11/2005 | Boyd et al. |
| 7,043,380 B2 | 5/2006 | Rodenberg et al. |
| 7,085,739 B1 | 8/2006 | Winter et al. |
| 7,130,719 B2 | 10/2006 | Ehlers et al. |
| 7,135,956 B2 | 11/2006 | Bartone et al. |
| 7,141,321 B2 | 11/2006 | McArthur et al. |
| 7,243,044 B2 | 7/2007 | McCalla |
| 7,249,169 B2 | 7/2007 | Blouin et al. |
| 7,343,226 B2 | 3/2008 | Ehlers et al. |
| 7,343,360 B1 | 3/2008 | Ristanovic et al. |
| 7,379,997 B2 | 5/2008 | Ehlers et al. |
| 7,418,428 B2 | 8/2008 | Ehlers et al. |
| 7,516,106 B2 | 4/2009 | Ehlers et al. |
| 7,599,866 B2 | 10/2009 | Yan et al. |
| 7,716,101 B2 | 5/2010 | Sandholm et al. |
| 7,953,519 B2 | 5/2011 | Hamilton, II et al. |
| 7,996,296 B2 | 8/2011 | Lange |
| 8,126,794 B2 | 2/2012 | Lange et al. |
| 8,183,826 B2 | 5/2012 | Tuffner et al. |
| 8,271,345 B1 | 9/2012 | Milgrom et al. |
| 8,355,827 B2 | 1/2013 | Egnor et al. |
| 8,478,452 B2 | 7/2013 | Pratt et al. |
| 8,504,463 B2 | 8/2013 | Johnson et al. |
| 8,527,389 B2 | 9/2013 | Johnson et al. |
| 8,577,778 B2 | 11/2013 | Lange et al. |
| 8,639,392 B2 | 1/2014 | Chassin |
| 8,694,409 B2 | 4/2014 | Chassin et al. |
| 8,700,225 B2 | 4/2014 | Pratt et al. |
| 8,706,650 B2 | 4/2014 | Ozog |
| 8,788,415 B2 | 7/2014 | Chassin et al. |
| 8,892,264 B2 | 11/2014 | Steve et al. |
| 9,026,473 B2 | 5/2015 | Chassin et al. |
| 9,087,359 B2 | 7/2015 | Chassin |
| 9,094,385 B2 | 7/2015 | Akyol et al. |
| 9,129,337 B2 | 9/2015 | Chassin et al. |
| 9,240,026 B2 | 1/2016 | Chassin et al. |
| 9,245,297 B2 | 1/2016 | Chassin et al. |
| 9,269,108 B2 | 2/2016 | Chassin et al. |
| 9,342,850 B2 | 5/2016 | Chassin et al. |
| 9,425,620 B2 | 8/2016 | Chassin et al. |
| 9,441,889 B2 | 9/2016 | Tugurlan et al. |
| 9,557,720 B1 * | 1/2017 | Woods .................. G01R 19/02 |
| 9,589,297 B2 | 3/2017 | Fuller et al. |
| 9,753,440 B2 | 9/2017 | Pratt et al. |
| 9,762,060 B2 | 9/2017 | Kalsi et al. |
| 9,817,375 B2 | 11/2017 | Li et al. |
| 9,954,363 B2 | 4/2018 | McCullough et al. |
| 9,991,711 B2 | 6/2018 | Black et al. |
| 10,177,697 B2 | 1/2019 | Mukoyama et al. |
| 10,210,568 B2 | 2/2019 | Lian et al. |
| 10,498,141 B2 | 12/2019 | Kalsi et al. |
| 10,651,652 B2 | 5/2020 | Lian et al. |
| 10,784,686 B2 | 9/2020 | Schneider et al. |
| 2001/0032029 A1 | 10/2001 | Kauffman |
| 2002/0038279 A1 | 3/2002 | Samuelson et al. |
| 2002/0091626 A1 | 7/2002 | Johnson et al. |
| 2002/0128747 A1 | 9/2002 | Mima |
| 2002/0132144 A1 | 9/2002 | McArthur et al. |
| 2002/0178047 A1 | 11/2002 | Or et al. |
| 2003/0014379 A1 | 1/2003 | Saias et al. |
| 2003/0023540 A2 | 1/2003 | Johnson et al. |
| 2003/0036820 A1 | 2/2003 | Yellepeddy et al. |
| 2003/0040844 A1 | 2/2003 | Spool et al. |
| 2003/0040845 A1 | 2/2003 | Spool et al. |
| 2003/0041002 A1 | 2/2003 | Hao et al. |
| 2003/0041016 A1 | 2/2003 | Spool et al. |
| 2003/0041017 A1 | 2/2003 | Spool et al. |
| 2003/0055774 A1 | 3/2003 | Ginsberg |
| 2003/0078797 A1 | 4/2003 | Kanbara et al. |
| 2003/0093332 A1 | 5/2003 | Spool et al. |
| 2003/0093357 A1 | 5/2003 | Guler et al. |
| 2003/0139939 A1 | 7/2003 | Spool et al. |
| 2003/0144864 A1 | 7/2003 | Mazzarella |
| 2003/0149672 A1 | 8/2003 | Laskoski |
| 2003/0216971 A1 | 11/2003 | Sick et al. |
| 2004/0010478 A1 | 1/2004 | Peljto et al. |
| 2004/0024483 A1 | 2/2004 | Holcombe |
| 2004/0128266 A1 | 7/2004 | Yellepeddy et al. |
| 2004/0133529 A1 | 7/2004 | Munster |
| 2004/0140908 A1 | 7/2004 | Gladwin et al. |
| 2004/0153330 A1 | 8/2004 | Miller et al. |
| 2004/0254688 A1 | 12/2004 | Chassin et al. |
| 2005/0015283 A1 | 1/2005 | Iino et al. |
| 2005/0027636 A1 | 2/2005 | Gilbert et al. |
| 2005/0065867 A1 | 3/2005 | Aisu et al. |
| 2005/0114255 A1 | 5/2005 | Shields et al. |
| 2005/0125243 A1 | 6/2005 | Villalobos |
| 2005/0137959 A1 | 6/2005 | Yan et al. |
| 2005/0197875 A1 | 9/2005 | Kauffman |
| 2005/0228553 A1 | 10/2005 | Tryon |
| 2006/0036357 A1 | 2/2006 | Isono et al. |
| 2006/0116794 A1 * | 6/2006 | Stoupis ............. H02J 13/00028 |
| | | 700/286 |
| 2006/0241951 A1 | 10/2006 | Cynamom et al. |
| 2006/0259199 A1 | 11/2006 | Gjerde et al. |
| 2006/0293980 A1 | 12/2006 | Corby et al. |
| 2007/0011080 A1 | 1/2007 | Jain et al. |
| 2007/0061248 A1 | 3/2007 | Shavit et al. |
| 2007/0087756 A1 | 4/2007 | Hoffberg |
| 2007/0124026 A1 | 5/2007 | Troxell et al. |
| 2008/0021628 A1 | 1/2008 | Tryon |
| 2008/0027639 A1 | 1/2008 | Tryon |
| 2008/0039980 A1 | 2/2008 | Pollack et al. |
| 2008/0046387 A1 | 2/2008 | Gopal et al. |
| 2008/0051977 A1 | 2/2008 | Tryon |
| 2008/0243664 A1 | 10/2008 | Shavit et al. |
| 2008/0243682 A1 | 10/2008 | Shavit et al. |
| 2008/0243719 A1 | 10/2008 | Shavit et al. |
| 2008/0297113 A1 | 12/2008 | Saeki et al. |
| 2008/0300907 A1 | 12/2008 | Musier et al. |
| 2008/0300935 A1 | 12/2008 | Musier et al. |
| 2008/0306801 A1 | 12/2008 | Musier et al. |
| 2008/0319893 A1 | 12/2008 | Mashinsky et al. |
| 2009/0063228 A1 | 3/2009 | Forbes |
| 2009/0132360 A1 | 5/2009 | Arfin et al. |
| 2009/0177591 A1 | 7/2009 | Thorpe et al. |
| 2009/0195349 A1 | 8/2009 | Frader-Thompson et al. |
| 2009/0228151 A1 | 9/2009 | Wang et al. |
| 2009/0307059 A1 | 12/2009 | Young et al. |
| 2009/0313174 A1 | 12/2009 | Hafner et al. |
| 2010/0010939 A1 | 1/2010 | Arfin et al. |
| 2010/0049371 A1 | 2/2010 | Martin |
| 2010/0057625 A1 | 3/2010 | Boss et al. |
| 2010/0076835 A1 | 3/2010 | Silverman |
| 2010/0106332 A1 | 4/2010 | Chassin et al. |
| 2010/0106641 A1 | 4/2010 | Chassin et al. |
| 2010/0107173 A1 | 4/2010 | Chassin |
| 2010/0114387 A1 | 5/2010 | Chassin |
| 2010/0121700 A1 | 5/2010 | Wigder et al. |
| 2010/0179862 A1 | 7/2010 | Pratt et al. |
| 2010/0216545 A1 | 8/2010 | Lange et al. |
| 2010/0217550 A1 | 8/2010 | Crabtree et al. |

(56) References Cited

U.S. PATENT DOCUMENTS

| | | | |
|---|---|---|---|
| 2010/0218108 A1 | 8/2010 | Crabtree et al. | |
| 2010/0241608 A1 | 9/2010 | Huang et al. | |
| 2010/0256999 A1 | 10/2010 | Ghani et al. | |
| 2010/0332373 A1 | 12/2010 | Crabtree et al. | |
| 2011/0015801 A1 | 1/2011 | Mazzarella | |
| 2011/0016055 A1 | 1/2011 | Mazzarella | |
| 2011/0081955 A1 | 4/2011 | Lange et al. | |
| 2011/0301964 A1 | 12/2011 | Conwell | |
| 2012/0022995 A1 | 1/2012 | Lange | |
| 2012/0029897 A1* | 2/2012 | Cherian | H02J 13/00 703/18 |
| 2012/0083930 A1 | 4/2012 | Ilic et al. | |
| 2012/0144828 A1* | 6/2012 | Lazaris | H02J 3/381 60/641.1 |
| 2012/0249286 A1* | 10/2012 | Bush | H02H 7/261 340/3.43 |
| 2012/0278220 A1 | 11/2012 | Chassin et al. | |
| 2012/0278221 A1 | 11/2012 | Fuller et al. | |
| 2013/0024043 A1* | 1/2013 | Shaffer | H02H 7/30 700/297 |
| 2013/0218743 A1 | 8/2013 | Chassin et al. | |
| 2013/0218744 A1 | 8/2013 | Chassin et al. | |
| 2013/0254090 A1 | 9/2013 | Chassin et al. | |
| 2013/0268132 A1 | 10/2013 | Pratt et al. | |
| 2013/0325691 A1 | 12/2013 | Chassin et al. | |
| 2013/0325692 A1 | 12/2013 | Chassin et al. | |
| 2014/0172503 A1 | 6/2014 | Hammerstrom et al. | |
| 2014/0188689 A1 | 7/2014 | Kalsi et al. | |
| 2014/0201018 A1 | 7/2014 | Chassin | |
| 2014/0233620 A1* | 8/2014 | Bernheim | H04L 43/0847 375/224 |
| 2014/0379157 A1* | 12/2014 | Das | H02J 3/34 700/295 |
| 2015/0094965 A1 | 4/2015 | Schneider et al. | |
| 2015/0379542 A1 | 12/2015 | Lian et al. | |
| 2016/0091539 A1 | 3/2016 | Williams et al. | |
| 2016/0092978 A1 | 3/2016 | Lian et al. | |
| 2016/0092986 A1 | 3/2016 | Lian et al. | |
| 2016/0315472 A1 | 10/2016 | McCullough et al. | |
| 2018/0026445 A1 | 1/2018 | Kalsi et al. | |
| 2018/0131200 A1 | 5/2018 | Crawford et al. | |
| 2018/0329383 A1 | 11/2018 | Lian et al. | |
| 2019/0020220 A1 | 1/2019 | Lian et al. | |
| 2019/0027933 A1 | 1/2019 | Lian et al. | |
| 2019/0163150 A1* | 5/2019 | Wong | G05B 19/042 |
| 2019/0173285 A1 | 6/2019 | Schneider et al. | |
| 2020/0021131 A1 | 1/2020 | Schneider et al. | |
| 2020/0076192 A1 | 3/2020 | Kalsi et al. | |
| 2020/0143489 A1 | 5/2020 | Bhattarai et al. | |
| 2020/0203951 A1 | 6/2020 | Alam et al. | |
| 2020/0389024 A1 | 12/2020 | Vartanian et al. | |
| 2021/0110319 A1 | 4/2021 | Gourisetti et al. | |
| 2021/0210957 A1 | 7/2021 | Du et al. | |

OTHER PUBLICATIONS

Abdel-Magid et al., "Robust tuning of power system stabilizer in multimachine power systems," IEEE Trans. Power Syst., vol. 15, No. 2, pp. 735-740 (May 2000).

Aboul-Ela et al., "Damping controller design for power system oscillations using global signals," IEEE Trans. Power Syst., vol. 11, No. 2, pp. 767-773 (May 1996).

AEP gridSMART Demonstration Project, Available: http://www.gridsmartohio.com/, Aug. 2013, 1 page.

AEP Ohio power company standard tariff, Available: https://www.aepohio.com/account/bills/rates/AEPOhioRatesTariffsOH.aspx, Issued: Aug. 28, 2015, 187 pages.

Alimisis et al., "Voltage-VAr Optimization (VVO) future trends, challenges and opportunities," in *proc. IEEE Power & Energy Society Innovative Smart Grid Technologies Conference*, Apr. 2017, 5 pages.

Allcott, "Real Time Pricing and Electricity Markets," Harvard University, Feb. 5, 2009, 77 pages.

Arnold et al., "Extremum Seeking Control of Smart Inverters for VAR compensation," in *proc. IEEE Power and Energy Society General Meeting*, Jul. 2015, 5 pages.

Barr et al., "SPIDERS Phase II Technical Report," Burns & McDonnell, [Online] Available: https://www.energy.gov/sites/prod/files/2014/05/f15/spiders_industry_day_technical_report_2014.pdf, May 2014, 36 pages.

Basar, Lecture Notes on Noncooperative Game Theory, Jul. 26, 2010, 142 pages.

Battelle Memorial Institute, gridlab-d / generators / diesel.dg.cpp, document dated Feb. 12, 2012, downloaded from https://github.com/gridlab-d/gridlab-d/blob/feature/730/generators/diesel_dg.cpp on Oct. 23, 2019, 107 pages.

Bilgin et al., "Smart building real time pricing for offering load-side regulation service reserves," In 52nd IEEE Conference on Decision and Control, pp. 4341-4348, 2013.

Bishop et al., "Pattern recognition and machine learning," vol. 1, Springer, New York, 2006, 703 pages.

Borenstein et al., "Diagnosing Market Power in California's Deregulated Wholesale Electricity Market," University of California Energy Institute, Power, PWP-064, 54 pp. (Aug. 2000).

Borenstein et al., "Diagnosing Market Power in California's Deregulated Wholesale Electricity Market," University of California Energy Institute, Power, PWP-064, 52 pp. (Mar. 2000).

Borenstein et al., "Dynamic Pricing, Advanced Metering, and Demand Response in Electricity Markets," Center for the Study of Energy Markets, 2002, 103 pages.

Boukarim et al., "A comparison of classical, robust and decetnralized control design for multiple power system stabilizers," IEEE Trans. Power Syst., vol. 15, No. 4, pp. 1287-1292 (Nov. 2000).

Boyd et al., "Load Reduction, Demand Response, and Energy Efficient Technologies and Strategies," Pacific Northwest National Laboratory PNNL-18111, 44 pp. (Nov. 2008).

Brambley, "Thinking Ahead: Autonomic Buildings," ACEEE Summer Study on the Energy Efficiency in Buildings, vol. 7, pp. 73-86 (2002).

Burke et al., "Robust Control of Residential Demand Response Network with Low Bandwidth Input," In Proceedings of Dynamic Systems and Control Conference, American Society of Mechanical Engineers, pp. 413-415, Oct. 20-22, 2008.

Cai et al., "Economic Dispatch in Microgrids Using Multi-Agent System," In North American Power Grid Symposium (NAPS), Sep. 2012, 5 pages.

Callaway et al., "Achieving controllability of electric loads," Proc. IEEE, vol. 99, No. 1, pp. 184-199 (Jan. 2011).

Chandley, "How RTOs Set Spot Market Prices (And How It Helps Keep the Lights On)," PJM Interconnection, 23 pp. (Sep. 2007).

Chang et al., "Modeling and Control of Aggregated Air Conditioning Loads Under Realistic Conditions," 2013 IEEE PES Innovative Smart Grid Technologies (ISGT), Feb. 2013, 6 pages.

Chao, "Price-Responsive Demand Management for a Smart Grid World," The Electricity Journal, vol. 23, No. 1, Jan. 2010, pp. 7-20.

Chassin, "The Abstract Machine Model for Transaction-based System Control," Pacific Northwest National Laboratory PNNL-14082, 28 pp. (Nov. 2002).

Chassin et al., "Decentralized Coordination through Digital Technology, Dynamic Pricing, and Customer-Driven Control: The GridWise Testbed Demonstration Project," The Electricity Journal, vol. 21, pp. 51-59 (Oct. 2008).

Chassin et al., "Gauss-Seidel Accelerated: Implementing Flow Solvers on Field Programmable Gate Arrays," IEEE Power Engineering Society General Meeting, 5 pp. (Jun. 2006).

Chassin et al., "GridLAB-D: An Open-source Power Systems Modeling and Simulation Environment," In IEEE Transmission and Distribution Conference and Exposition, Aug. 2008, 5 pages.

Chassin, "GridLAB-D Technical Support Document: Tape Modules Version 1.0," Pacific Northwest National Laboratory PNNL-17614, 8 pp. (May 2008).

Chassin, "GridLAB-D Technical Support Document: Commercial Modules Version 1.0," Pacific Northwest National Laboratory PNNL-17615, 8 pp. (May 2008).

(56) References Cited

OTHER PUBLICATIONS

Chassin, "GridLAB-D Technical Support Document: Network Module Version 1.0," Pacific Northwest National Laboratory PNNL-17616, 10 pp. (May 2008).
Chassin et al., "Modeling Power Systems as Complex Adaptive Systems," Pacific Northwest National Laboratory PNNL-14987, 151 pp. (Dec. 2004).
Chassin et al., "The pacific northwest demand response market demonstration," IEEE, 6 pp. (Jul. 2008).
Chassin et al., "Project 2.6—Enhancement of the Whole-Building Diagnostician," Pacific Northwest National Laboratory PNNL-14383, 17 pp. (Aug. 2003).
Chassin, "Statistical Mechanics: A Possible Model for Market-based Electric Power Control", Proc. of the 37th Hawaii Int'l Conf. on System Sciences, 10 pp. (Jan. 2004).
Chen et al., "The Influence of Topology Changes on Inter-area Oscillation Modes and Mode Shapes," IEEE Power and Energy Society General Meeting, 7 pp. (Jul. 2011).
Chen et al., "Real-time power control of data centers for providing regulation service," In 52nd IEEE Conference on Decision and Control, Dec. 10-13, 2013, pp. 4314-4321.
Chen et al., "Two Market Models for Demand Response in Power Networks," In Proceedings of 2010 First IEEE International Conference on Smart Grid Communications (SmartGridComm), Oct. 4-6, 2010, pp. 397-402.
Clearwater et al., "Thermal Markets for Controlling Building Environments," Energy Engineering, vol. 91, No. 3, pp. 26-56 (1994).
Collins, "Error Analysis in Scanned Holography," Oregon State University, Ph.D. thesis, Jun. 1970, 110 pages.
Conejo et al., "Price-Taker Bidding Strategy Under Price Uncertainty," IEEE Transactions on Power Systems, vol. 17, No. 4, Nov. 2002, pp. 1081-1088.
Cong et al., "FlowMap: An Optimal Technology Mapping Algorithm for Delay Optimization in Lookup-Table Based FPGA Designs," IEEE Transactions on Computer-Aided Design of Integrated Circuits and Systems, vol. 13, No. 1, Jan. 1994, 12 pages.
De Ladurantaye et al., "Strategic Bidding for Price-Taker Hydro-electricity Producers," IEEE Transactions on Power Systems, vol. 22, No. 4, Nov. 2007.
De Steese et al., "Conservation Voltage Reduction Potential in the Pacific Northwest," in *proc. Energy Conversion Engineering Conference*, Aug. 1990, pp. 43-47.
Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).
Denton et al., "Spot Market Mechanism Design and Competitivity Issues in Electric Power," Proc. of the 31st Hawaii International Conference on System Sciences, vol. 3, pp. 48-56 (Jan. 1998).
Diao et al., "Deriving Optimal Operational Rules for Mitigating Inter-area Oscillations," IEEE/PES Power Systems Conference & Exposition, 8 pp. (Mar. 2011).
Dominguez-Garcia et al., "Resilient Networked Control of Distributed Energy Resources," IEEE Journal on Selected Areas in Communications, vol. 30, No. 6, Jul. 2012, pp. 1137-1148.
Driesen et al., "Design for Distributed Energy Resources," IEEE Power & Energy Magazine, vol. 6, No. 3, pp. 30-40, May/Jun. 2008.
El-Moursi et al., "Novel STATCOM controller for mitigating SSR and damping power system oscillations in a series compensated wind park," IEEE Trans. Power Electron., vol. 25, No. 2, pp. 40-45 (Feb. 2010).
Eto et al., "Frequency Control Requirements for Reliable Interconnection Frequency Response," LBNL-2001103, Lawrence Berkley National Laboratory, Feb. 2018, 29 pages.
Eto et al., "Use of Frequency Response Metrics to Assess the Planning and Operating Requirements for Reliable Integration of Variable Renewable Generation," LBNL-4142E, Ernest Orlando Lawrence Berkley National Laboratory, Dec. 2010, 141 pages.
Fahrioglu et al., "Designing Incentive Compatible Contracts for Effective Demand Management," IEEE Transactions on Power Systems, vol. 15, No. 4, Nov. 2000, pp. 1255-1260.
Fan et al., "Linear quadratic control of SSSC to increase power oscillations damping of HVDC-AC power system," in Proc. 2015 IEEE Power Energy Society General Meeting, Jul. 2015, pp. 1-5.
Fan et al., "Oscillation Damping Control Using Multiple High Voltage DC Transmission Lines: Controllability Exploration," in Proc. 2018 IEEE Power Energy Society Transmission, Distribution, pp. 1-5 (2018).
Farhangi, "The Path of the Smart Grid," IEEE Power & Energy Magazine, vol. 8, No. 1, pp. 18-28, Jan./Feb. 2010.
Farrokhabadi et al., "Frequency Control in Isolated/Islanded Microgrids Through Voltage Regulation," *IEEE Transactions on Smart Grid*, vol. 8, No. 3, May 2017, pp. 1185-1194.
Farsangi et al., "Choice of FACTS device control inputs for damping interarea oscillations," IEEE Trans. Power Syst., vol. 19, No. 2, pp. 1135-1143 (May 2004).
Faruqui et al., "The impact of informational feedback on energy consumption—A survey of the experimental evidence," Energy, vol. 35, No. 4, 2010, pp. 1598-1608.
Feigenbaum et al., "Distributed Algorithmic Mechanism Design: Recent Results and Future Directions," In Proceedings of the 6th International Workshop on Discrete Algorithms and Methods for Mobile Computing and Communications, Sep. 2002, 13 pages.
Fernandez et al., "Self Correcting HVAC Controls: Algorithms for Sensors and Dampers in Air-Handling Units," Pacific Northwest Laboratory PNNL-19104, 49 pp. (Dec. 2009).
Francis et al., "Chortle-crf: Fast Technology Mapping for Lookup Table-Based FPGAs," 28th ACM/IEEE Design Automation Conference, Jun. 21, 1991, pp. 227-233.
Fuller et al., "Analysis of Residential Demand Response and Double-Auction Markets," In Power and Energy Society General Meeting, IEEE, Jul. 24-29, 2011, 7 pages.
Fuller et al., "Analysis of Residential Demand Response and Double-Auction Markets," IEEE Power and Energy Society General Meeting, 7 pp. (Jul. 2011).
Fuller et al., "Evaluation of Representative Smart Grid Investment Grant Project Technologies: Demand Response," Pacific Northwest National Laboratory PNNL-20772, 349 pp. (Feb. 2012).
Fuller et al., "Modeling of GE Appliances in GridLAB-D: Peak Demand Reduction," Pacific Northwest National Laboratory PNNL-21358, 157 pp. (Apr. 2012).
Gatterbauer, "Interdependencies of Electricity Market Characteristics and Bidding Strategies of Power Producers," Master's Thesis, Massachusetts Institute of Technology, 33 pp. (May 2002).
Georgilakis, "Market Clearing Price Forecasting in Deregulated Electricity Markets Using Adaptively Trained Neural Networks," Hellenic Conference on Artificial Intelligence, vol. 3955, pp. 56-66 (2006).
Gibbard et al., "Interactions between, and effectiveness of, power system stabilizers and FACTS devices stabilizers in multimachine systems," IEEE Trans., Power Syst., vol. 15, No. 2, pp. pp. 748-755 (May 2000).
Gjerstad et al., "Price Formation in Double Auctions," Games and Economic Behavior, vol. 22, article No. GA970576, pp. 1-29 (1998). (Document marked as Received Nov. 30, 1995).
Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).
GridLAB-D residential module user's guide, Available: http://sourceforeg.net/apps/mediawiki/gridlab-d, last modified on Oct. 22, 2013, 24 pages.
Gridlab-d / generators / diesel.dg.cpp, [Online] https://github.com/gridlab-d/gridlab-d/blob/feature/730/generators/diesel_dg.cpp, 66 pages.
Guttromson et al., "Residential energy resource models for distribution feeder simulation," IEEE, vol. 1, pp. 108-113 (Jul. 2003).
Hammerstrom et al., "Pacific Northwest GridWise™ Testbed Demonstration Projects," Part I, Olympic Peninsula Project, Pacific Northwest National Laboratory, Oct. 2007, 157 pages.
Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).
Hammerstrom et al., "Standardization of a Hierarchical Transactive Control System," Grid Interop Conf., 7 pp. (Nov. 2009).

(56) References Cited

OTHER PUBLICATIONS

Han et al., "Development of an Optimal Vehicle-to-Grid Aggregator for Frequency Regulation," IEEE Transactions on Smart Grid, vol. 1, No. 1, Jun. 2010, pp. 65-72.
Hao et al., "Aggregate Flexibility of Thermostatically Controlled Loads," IEEE Transactions on Power Systems, vol. 30, No. 1, Jan. 2015, pp. 189-198.
Hao et al., "Ancillary Service for the Grid via Control of Commercial Building HVAC Systems," In 2013 American Control Conference, IEEE, Jun. 17-19, 2013, pp. 467-472.
Hatley et al., "Energy Management and Control System: Desired Capabilities and Functionality," Pacific Northwest National Laboratory PNNL-15074, 46 pp. (Apr. 2005).
Hô et al., "Econophysical Dynamics of Market-Based Electric Power Distribution Systems," IEEE, pp. 1-6 (Jan. 2006).
Hope & Wilson, Industrial Voltage Optimization at Large Industrial Facility Brings Energy Savings, ACEEE Summer Study on Energy Efficiency in Industry, document dated 2011, 12 pages.
Hsu et al., "Dispatch of Direct Load Control Using Dynamic Programming," IEEE Transactions on Power Systems, vol. 6, No. 3, Aug. 1991, pp. 1056-1061.
Huang et al., "Analytics and Transactive Control Design for the Pacific Northwest Smart Grid Demonstration Project," In 2010 First IEEE International Conference on Smart Grid Communications (SmartGridCom), IEEE, Oct. 4-6, 2010, pp. 449-454.
Huang et al., "MANGO—Modal Analysis for Grid Operation: A Method for Damping Improvement through Operating Point Adjustment," Pacific Northwest National Laboratory PNNL-19890, 92 pp. (Oct. 2010).
Huang et al., "Transforming Power Grid Operations," Scientific Computing, vol. 45, No. 5, pp. 22-27 (Apr. 2007).
Huberman et al., "A Multi-Agent System for Controlling Building Environments," In Proceedings of the First International Conference on Multiagent Systems, Jun. 12-14, 1995, pp. 171-176.
Human Solutions, "Anthroscan—System Solution for Serial Measurements" [undated], 4 pages.
Hurwicz, "The Design of Mechanisms for Resource Allocation," In The American Economic Review, Papers and Proceedings of the Eighty-fifth Annual Meeting of the American Economic Association, vol. 63, No. 2, May 1973, 31 pages.
IEEE PES Distribution Systems Analysis Subcommittee Radial Test Feeders, [Online] Available: http://ewh.ieee.org/soc/pes/dsacom/testfeeders/index.html, 2017, 1 page.
Jovanovic et al., "Digital System for Power Line Frequency Measurement," Proc. XLVIII ETRAN Conference, vol. I, Jun. 2004, pp. 29-32.
Kakhbod et al., "Power Allocation and Spectrum Sharing in Wireless Networks: An Implementation Theory Approach," Mechanisms and Games for Dynamic Spectrum Allocation (Chapter 5), Feb. 2014, 42 pages.
Kamwa et al., "Wide-area measurement based stabilizing control of large power systems—A decentralized/hierarchical approach," IEEE Trans. Power Syst., vol. 16, No. 1, pp. 136-153 (Feb. 2001).
Kannberg et al., "GridWise: The Benefits of a Transformed Energy System," Pacific Northwest National Laboratory PNNL-14396, 48 pp. (Sep. 2003).
Kar et al., "Distributed Robust Economic Dispatch in Power Systems: A Concensus+Innovations Approach," In Proc. IEEE Power and Energy Society General Meeting, Jul. 2012, 8 pages.
Katipamula et al., "Evaluation of Residential HVAC Control Strategies for Demand Response Programs," ASHRAE Trans., Symp. on Demand Response Strategies for Building Systems, 12 pp (Jan. 2006).
Katipamula et al., "Transactive Controls: A Market-Based GridWise Controls for Building Systems," Pacific Northwest National Laboratory PNNL-15921, 14 pp. (Jul. 2006).
Kennedy et al., "Conservation Voltage Reduction (CVR) at Snohomish County PUD," IEEE Transactions on Power Systems, vol. 6, No. 3, Aug. 1991, pp. 986-998.
Kersting, "Radial Distribution Test Feeders," IEEE Transactions on Power Systems, vol. 6, No. 3, pp. 975-985, Aug. 1991.
Kiesling, "Retail Electricity Deregulation: Prospects and Challenges for Dynamic Pricing and Enabling Technologies," The Searle Center Annual Review of Regulation, 44 pp. (May 2007).
Kim et al., "Scheduling Power Consumption With Price Uncertainty," IEEE Transactions on Smart Grid, vol. 2, No. 3, Sep. 2011, pp. 519-527.
Kinter-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).
Kirschner, "Implementation of Conservation Voltage Reduction at Commonwealth Edison," IEEE Transaction on Power Systems, vol. 5, No. 4, Nov. 1990, pp. 1178-1182.
Klein et al., "A fundamental study of inter-area oscillations in power systems," IEEE Trans. Power Syst., vol. 6, No. 3, pp. 914-920, (1991).
Kok et al., "Agent-based Electricity Balancing with Distributed Energy Resources, A Multiperspective Case Study," Proc. Hawaii Int'l Conf. on System Sciences, 10 pp. (Jan. 2008).
Kok et al., "Dynamic Pricing by Scalable Energy Management Systems—Field Experiences and Simulation Results using PowerMatcher," In IEEE Power and Energy Society General Meeting, Jul. 2012, 8 pages.
Kok et al., "Intelligence in Electricity Networks for Embedding Renewables and Distributed Generation," In Intelligent infrastructures, Springer, 2010, pp. 179-209.
Kok et al., "PowerMatcher: Multiagent Control in the Electricity Infrastructure," AAMAS, 8 pp. (Jul. 2005).
Kundur, Power system stability and control, New York: McGraw-Hill, (1994).
Lasseter et al., "Integration of Distributed Energy Resources. The CERTS MicroGrid Concept," Lawrence Berkeley National Laboratory, Oct. 2013, 32 pages.
Lauria, "Conservation Voltage Reduction (CVR) at Northeast Utilities," IEEE Transactions on Power Delivery, vol. 2, No. 4, Oct. 1987, pp. 1186-1191.
Lemay et al., "An Integrated Architecture for Demand Response Communications and Control," Hawaii Int'l Conf. on System Sciences, 10 pp. (Jan. 2008).
Lerch et al., "Advanced SVC control for damping power system oscillations," IEEE Trans. Power Syst., vol. 6, No. 2, pp. 524-535 (May 1991).
Lesieutre et al., "Phasor Modeling Approach for Single Phase A/C Motors," in proc. IEEE Power and Energy Society General Meeting, Jul. 2008, 7 pages.
Li et al., "Integrated Power Management of Data Centers and Electric Vehicles for Energy and Regulation Market Participation," IEEE Transactions on Smart Grid, vol. 5, No. 5, Sep. 2014, pp. 2283-2294.
Li et al., Market-Based Coordination of Thermostatically Controlled Loads—Part I: Mechanism Design Formulation, IEEE Transactions on Power System, under review, Mar. 15, 2015, 11 pages.
Li et al., Market-Based Coordination of Thermostatically Controlled Loads—Part II: Unknown Parameters and Case Studies, IEEE Transactions on Power System, has been accepted for inclusion in a future issue, 9 pages.
Li et al., "A Market Mechanism Design Approach for Coordination of Thermostatically Controlled Loads With Unknown Parameters (Part I)," IEEE Transactions on Power System, 2014, 8 pages.
Li et al., "A Market Mechanism Design Approach for Coordination of Thermostatically Controlled Loads With Unknown Parameters (Part II)," IEEE Transactions on Power System, 2014, 8 pages.
Li et al., "A Mechanism Design Approach for Coordination of Thermostatically Controlled Loads," Available at http://arxiv.org/abs/1503.02705, last updated Jun. 15, 2015, 16 pages.
Li et al., "Optimal Demand Response Based on Utility Maximization in Power Networks," In Power and Energy Society General Meeting, IEEE, Jul. 24-29, 2011, 8 pages.

(56) References Cited

OTHER PUBLICATIONS

Li et al., "Wide-area robust coordination approach of HVDC and FACTS controllers for damping multiple interarea oscillations," IEEE Trans. Power Del., vol. 27, No. 3, pp. 1096-1105 (Jul. 2012).
Lian et al., "Decentralized robust control for damping inter-area oscillations in power systems," CoRR, vol. abs/1701.02036, (2017). [Online]. Available: http://arxiv.org/abs/1701. 02036.
Lian et al., "Hierarchical decentralized control strategy for demand-side primary frequency response," in 2016 IEEE Power and Energy Society General Meeting (PESGM), Jul. 2016, pp. 1-5.
Lian et al., "Wide-area Demand-side Control for Inter-area Oscillation Mitigation in Power Systems," 5 pp. (no date).
Liu et al., "Planning and Control of Electric Vehicles Using Dynamic Energy Capacity Models," In 52nd Annual Conference on Decision and Control (CDC), IEEE, Dec. 10-13, 2013, pp. 379-384.
Ljung, System Identification: Theory for the User, 255 pages (Prentice Hall 1987).
López et al., Optimal Restoration/Maintenance Switching Sequence of Unbalanced Three-Phase Distribution Systems, *IEEE Transactions on Smart Grid*, vol. 9, No. 6, Nov. 2018, pp. 6058-6068.
Lu et al., "Control Strategies of Thermostatically Controlled Appliances in a Competitive Electricity Market," IEEE Proc. Power Engineering Society General Meeting, pp. 202-207 (Jun. 2005).
Lu et al., "Design Considerations for Frequency Responsive Grid Friendly Appliances," IEEE PES Trans. and Distribution Conference and Exhibition, 6 pp. (May 2006).
Lu et al., "An Evaluation of the HVAC Load Potential for Providing Load Balance Service," IEEE Transactions on Smart Grid, vol. 3, No. 3, Sep. 2012, pp. 1263-1270.
Lu et al., "Grid Friendly Device Model Development and Simulation," Pacific Northwest National Laboratory PNNL-18998, 52 pp. (Nov. 2009).
Lu et al., "Modeling Uncertainties in Aggregated Thermostatically Controlled Loads Using a State Queueing Model," IEEE Trans. on Power Systems, vol. 20, No. 2, pp. 725-733 (May 2005).
Lu et al., "Reputation-Aware Transaction Mechanisms in Grid Resource Market," IEEE Sixth Int'l Conf. on Grid and Cooperative Computing, 6 pp. (Aug. 2007).
Lu et al., "Simulating Price Responsive Distributed Resources," IEEE, vol. 3, pp. 1538-1543 (Oct. 2004).
Lu et al., "A State-Queueing Model of Thermostatically Controlled Appliances," IEEE Trans. on Power Systems, vol. 19, No. 3, pp. 1666-1673 (Aug. 2004).
Manbachi et al., "Impact of V2G on Real-time Adaptive Volt/VAr Optimization of Distribution Networks," in *proc. IEEE Electrical Power & Energy Conference*, Aug. 2013, .6 pages.
Marion et al., "User's Manual for TMY2s: Typical Meteorological Years: Derived from the 1961-1990 National Solar Radiation data Base," National Renewable Energy Laboratory, Jun. 1995, 55 pages.
Mas-Colell et al., "Microeconomic Theory," Oxford University Press, © 1995, 501 pages.
Maskin, "Mechanism Design: How to Implement Social Goals," In Les Prix Nobel 2007, pp. 296-307 (2008).
Mathieu et al., "State Estimation and Control of Electric Loads to Manage Real-Time Energy Imbalance," IEEE Transactions on Power Systems, vol. 28, No. 1, Feb. 2013, pp. 430-440.
Moeslund, et al., "A Survey of Computer Vision-Based Human Motion Capture," Computer Vision and Image Understanding, vol. 81, No. 3, Mar. 2001, pp. 231-268.
Mohsenian-Rad et al., "Optimal Residential Load Control With Price Prediction in Real-Time Electricity Pricing Environments," IEEE Transactions on Smart Grid, vol. 1, No. 2, Sep. 2010, pp. 120-133.
Molzahn, et al., "Implementation of a Large-Scale Optimal Power Flow Solver Based on Semidefinite Programming," *IEEE Transactions on Power Systems*, vol. 28, No. 4, Nov. 2013, pp. 3987-3998.
Motalleb et al., "Providing frequency regulation reserve services using demand response scheduling," Energy Conversion and Management, vol. 124, pp. 439-452, (2016). [Online]. Available: http://www.sciencedirect.com/science/article/pii/S0196890416306276.
Nanduri et al., "A Methodology for Evaluating Auction Based Pricing Strategies in Deregulated Energy Markets," Working Paper, 12 pp. (2005).
Nanduri, et al., "A Reinforcement Learning Model to Assess Market Power Under Auction-Based Energy Pricing," IEEE Trans. on Power Systems, vol. 22, No. 1, pp. 85-95 (Feb. 2007).
Neely et al., "Damping of interarea oscillations using energy storage," in Proc. 2013 IEEE PES General Meeting, Vancouver, BC, (Jul. 2013).
Nguyen et al., "Optimal Bidding Strategy for Microgrids Considering Renewable Energy and Building Thermal Dynamics," IEEE Transactions on Smart Grid, vol. 5, No. 4, Jul. 2014, pp. 1608-1620.
Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).
Non-Final Office Action issued in U.S. Appl. No. 14/866,457, dated Mar. 13, 2018, 18 pages.
Notice of Allowance for U.S. Appl. No. 14/866,457, dated Sep. 4, 2018, 9 pages.
Ntakou et al., "Price Discovery in Dynamic Power Markets with Low-Voltage Distribution-Network Participants," In IEEE Transmission and Distribution Conference and Exposition, Apr. 14-17, 2014, 5 pages.
O'Neill et al., "Model-Based Thermal Load Estimation in Buildings," Fourth National Conference of IBPSA-USA, Aug. 2010, 9 pages.
Pal et al., "Robust damping controller design in power systems with superconducting magnetic energy storage devices," IEEE Trans. Power Syst., vol. 15, No. 1, pp. 320-325, (Feb. 2000).
Palensky et al., "Demand Side Management: Demand Response, Intelligent Energy Systems, and Smart Loads," IEEE Transactions on Industrial Informatics, vol. 7, No. 3, Aug. 2011, pp. 381-388.
Pantoja et al., "Dispatch of Distributed Generators under Local-Information Constraints," In 2014 American Control Conference (ACC), Jun. 4-6, 2014, pp. 2682-2687.
Papavasilou et al., "Large-Scale Integration of Deferrable Demand and Renewable Energy Sources", IEEE Transactions on Power Systems, vol. 29, No. 1, pp. 489-499, Jan. 1, 2014.
Parkes, "Iterative Combinatorial Auctions: Achieving Economic and Computational Efficiency," PhD thesis, University of Pennsylvania, 2000, 115 pages.
Paschalidis et al., "Demand-Side Management for Regulation Service Provisioning Through Internal Pricing," IEEE Transactions on Power System, vol. 27, No. 3, Aug. 2012, pp. 1531-1539.
Pedrasa et al., "Coordinated Scheduling of Residential Distributed Energy Resources to Optimize Smart Home Energy Services," IEEE Transactions on Smart Grid, vol. 1, No. 2, Sep. 2010, pp. 134-143.
Philpott et al., "Optimized Demand-Side Bids in Day-Ahead Electricity Markets", IEEE Transactions on Power Systems, vol. 21, No. 2, pp. 488-498, (May 2006).
Pierre et al., "Supervisory system for a wide area damping controller using pdci modulation and real-time pmu feedback," in 2016 IEEE Power and Energy Society General Meeting (PESGM), Jul. 2016, pp. 1-5.
PJM wholesale market energy price, available at: http://www.pjm.com/markets-and-operations/energy.aspx, uploaded Sep. 16, 2015, 3 pages.
Plott et al., "Instability of Equilibria in Experimental Markets: Upward-sloping Demands, Externalities, and Fad-like Incentives," Southern Economic Journal, vol. 65 (3), 23 pp. (Jan. 1999).
Pourebrahimi et al., "Market-based Resource Allocation in Grids," IEEE Int'l Conf. on e-Science and Grid Computing, 8 pp. (2006).
Pratt et al., "Potential Impacts of High Penetration of Plug-in Hybrid Vehicles on the U.S. Power Grid," DOE/EERE PHEV Stakeholder Workshop, 14 pp. (Jun. 2007).
Rahimi et al., "Demand Response as a Market Resource Under the Smart Grid Paradigm," IEEE Transactions on Smart Grid, vol. 1, No. 1, Jun. 2010, pp. 82-88.

(56) References Cited

OTHER PUBLICATIONS

Ramos et al., "A new methodology for the coordinated design of robust decentralized power system damping controllers," IEEE Trans. Power Syst., vol. 19, No. 1, pp. 444-454 (Feb. 2004).
Rao et al., "Robust pole placement stabilizer design using linear matrix inequalities," IEEE Trans. Power Syst., vol. 15, No. 1, pp. 313-319 (Feb. 2000).
Rasouli et al., "Electricity Pooling Markets with Strategic Producers Possessing Asymmetric Information I: Elastic Demand," arXiv:1401.4230, Jan. 17, 2014, 8 pages.
"Recommendations for Updating the Technical Requirements for Inverters in Distributed Energy Resources," Smart Inverter Working Group, document dated Jan. 2014, http://www.energy.ca.gov/electricity_analysis/rule21/documents/recommendations_and_test_plan_documents/Recommendations_for_updating_Technical_Requirements_for_Inverters_in_DER_2014-02-07-CPUC.pdf, 91 pages.
Reiter, "Information Incentive and Performance in the (new) Welfare Economics," reprinted from American Economic Review, vol. 67, No. 1, Feb. 1977, 27 pages.
S&C Electric Company, IntelliTeam® VV Volt-VAR Optimization System, Mar. 12, 2016, 2 pages.
Sage et al., Estimation Theory with Applications to Communications and Control, 540 pages (1971).
Salehfar et al., "A Production Costing Methodology for Evaluation of Direct Load Control," IEEE Transactions on Power Systems, vol. 6, No. 1, Feb. 1991, pp. 278-284.
Samadi et al., "Advanced Demand Side Management for the Future Smart Grid Using Mechanism Design," IEEE Transactions on Smart Grid, vol. 3, No. 3, Sep. 2012, pp. 1170-1180.
Satayapiwat et al., "A Utility-based Double Auction Mechanism for Efficient Grid Resource Allocation," Int'l Symp. on Parallel and Distributed Processing with Applications (ISPA '08), pp. 252-260 (Dec. 10-12, 2008).
Schneider et al., "Analysis of Distribution Level Residential Demand Response," IEEE/PES Power System Conference and Exposition, 6 pp. (Mar. 2011).
Schneider et al., "Analytic Considerations and Design Basis for the IEEE Distribution Test Feeders," *In Review IEEE Trans. On Power System*, vol. 33, No. 3, May 2018, pp. 3181-3188.
Schneider et al., "Adaptive Dynamic Simulations for Distribution Systems Using Mult-State Load Models," *IEEE Trans. On Smart Grid*, vol. 10, No. 2, Mar. 2019, pp. 2257-2266.
Schneider et al., "Detailed End Use Load Modeling for Distribution System Analysis," IEEE Power and Energy Society General Meeting, 7 pp. (Jul. 2010).
Schneider et al., "Distribution Power Flow for Smart Grid Technologies," IEEE/PES Power System Conference and Exhibition, 7 pp. (Mar. 2009).
Schneider et al., "Enabling Resiliency Operations Across Multiple Microgrids With Grid Friendly Appliance Controllers," *IEEE Transactions on Smart Grid*, vol. 9, No. 5, Sep. 2018, pp. 4755-4764.
Schneider et al., "Evaluating the Feasibility to Use Microgrids as a Resiliency Resource," *IEEE Transactions on Smart Grid*, vol. 8, No. 2, Mar. 2017, pp. 687-696.
Schneider et al., "Evaluating the Magnitude and Duration of Cold Load Pick-up on Residential Distribution Feeders Using Multi-State Load Models," *IEEE Transactions on Power Systems*, vol. 31, No. 5, Sep. 2016, pp. 3765-3774.
Schneider, "Evaluation of Conservation Voltage Reduction (CVR) on a National Level," PNNL-19596, Pacific Northwest National Laboratory, Richland, Washington, Jul. 2010, 114 pages.
Schneider et al. "Improving Primary Frequency Response to Support Networked Microgrid Operations," DOI 10.1109/TPWRS.2018.2859742, IEEE Transactions on Power Systems, Jul. 2018, 9 pages.
Schneider et al., "A Method for Evaluating Volt-VAR Optimization Field Demonstrations," *IEEE Transactions on Smart Grid*, vol. 5, No. 4, Jul. 2014, pp. 1696-1703.
Schneider et al., "Modern Grid Strategy: Enhanced GridLAB-D Capabilities Final Report," Pacific Northwest National Laboratory PNNL-18864, 30 pp. (Sep. 2009).
Schneider et al., "Multi-State Load Models for Distribution System Analysis," *IEEE Transactions on Power Systems*, vol. 26, No. 4, Nov. 2011, pp. 2425-2433.
Schneider et al., "A Taxonomy of North American Radial Distribution Feeders," IEEE Power & Energy Society General Meeting, 6 pp. (Jul. 2009).
Schneider et al., "Voltage Control Devices on the IEEE 8500 Node Test Feeder," IEEE PES Transmission & Distribution Conference & Exposition, 6 pp. (Apr. 2010).
Sharma et al., "Local public good provisioning in networks: A Nash implementation mechanism," IEEE Journal on Selected Areas in Communications, vol. 30, No. 11, Dec. 2012, pp. 2105-2116.
Shi et al., "A Decentralized Volt/Var Optimization Scheme for Smart Distribution Systems," in *proc. IEEE Power & Energy Society Innovative Smart Grid Technologies Conference*, Sep. 2016, 5 pages.
Singh et al., "Effects of Distributed Energy Resources on Conservation Voltage Reduction (CVR)," *2011 IEEE Power and Energy Society General Meeting*, Jul. 2011, 7 pages.
Sonderegger, "Diagnostic Tests Determining the Thermal Response of a House," Lawrence Berkeley Laboratory, Nov. 1977, 18 pages.
Sonderegger, "Dynamic models of house heating based on equivalent thermal parameters," Ph.D. Thesis, Princeton University, Dec. 1978, 277 pages.
Steinway, Book Review of "Estimation Theory with Applications to Communication and Control," IEEE Transactions on Systems, Man, and Cybernetics, Oct. 1971, p. 405.
Taylor et al., "GridLAB-D Technical Support Document: Residential End-Use Module Version 1.0," Pacific Northwest National Laboratory PNNL-17694, 30 pp. (Jul. 2008).
Trudnowski et al., "PDCI damping control analysis for the western North American Power System," in Proc. 2013 IEEE PES General Meeting, Vancouver, BC, (Jul. 2013).
Trudnowski et al., "The MinniWECC System Model," Appendix 2 of Year 1 report of BPA contract 37508 (Sep. 2008).
Tuffner et al., "Grid Friendly Appliance Controllers to Increase the Dynamic Stability of Networked Resiliency-based Microgrids," *2018 IEEE/PES Transmission and Distribution Conference and Exposition (T&D)*, Apr. 2018, 5 pages.
Tuffner et al., "Modeling Load Dynamics to Support Resiliency-based Operations in Low-Inertia Microgrids," *IEEE Transactions on Smart Grid*, Mar. 2018, 12 pages.
"Turbine-Governor Models Standard Dynamic Turbine-Governor Systems in NEPLAN Power System Analysis Tool," NEPLAN V555 [Online] Available: http://www.neplan.ch/wp-content/uploads/2015/08/Nep_TURBINES_GOV.pdf, undated, 99 pages.
Vandael et al., "A Scalable Three-Step Approach for Demand Side Management of Plug-in Hybrid Vehicles," IEEE Transactions on Smart Grid, vol. 4, No. 2, Jun. 2013, pp. 720-728.
Van De Vyver et al., "Droop Control as an Alternative Inertial Response Strategy for the Synthetic Inertia on Wind Turbines," *IEEE Trans. On Power Systems*, vol. 31, No. 2, Mar. 2016, pp. 1129-1138.
Vrettos et al., "Demand Response with Moving Horizon Estimation of Individual Thermostatic Load States from Aggregate Power Measurements," In 2014 American Control Conference (ACC), Jun. 4-6, 2014, pp. 4846-4853.
Wang et al., Coordinating Multiple Sources for Service Restoration to Enhance Resilience of Distribution Systems, *IEEE Transactions on Smart Grid*, vol. 10, No. 5, Sep. 2019, pp. 5781-5793.
Weather History for KOSU, Aug. 2009, 5 pages.
Weather Underground: Weather History for Ohio State University, OH, downloaded from http://www.wunderground.com, 4 pages.
Wellman, "A Market-Oriented Programming Environment and its Application to Distributed Multicommodity Flow Problems," Journal of Artificial Intelligence Research, Aug. 1993, 23 pages.
Widergren et al., "Residential Real-time Price Response Simulation," IEEE Power and Energy Society General Meeting, pp. 3074-3078 (Jul. 2011).
Wilson et al., "Equivalent Thermal Parameters for an Occupied Gas-Heated House," ASHRAE Trans.; (United States), 91(CONF-850606-), 1985, pp. 1875-1885.

(56) References Cited

OTHER PUBLICATIONS

Wilson et al., "Saving Megawatts with Voltage Optimization," in *proc, Industrial Technology Conference*, Mar. 2010, 10 pages.

Wolak, "Residential Customer Response to Real-Time Pricing: The Anaheim Critical-Peak Pricing Experiment," document marked May 24, 2006, 49 pages (also published as Wolak, "Residential Customer Response to Real-Time Pricing: The Anaheim Critical-Peak Pricing Experiment," Center for the Study of Energy Markets (2007)).

Woodward easYgen-3000 Series, [Online] Available: http://www.woodward.com/easYgen3000Series.aspx, 3 pages.

Xu et al., "Microgrids for Service Restoration to Critical Load in a Resilient Distribution System," *IEEE Transactions on Smart Grid*, vol. 9, No. 1, Jan. 2018, pp. 426-437.

Yang, "Adaptively Robust Kalman Filters with Applications in Navigation," Chapter 2 of Sciences of Geodesy-1, Jun. 2010, pp. 49-82.

Yang et al., "Consensus Based Approach for Economic Dispatch Problem in a Smart Grid," IEEE Transactions on Power Systems, vol. 28, No. 4, Nov. 2013, pp. 4416-4426.

Yang et al., "TCSC controller design for damping interarea oscillations," IEEE Trans. Power Syst., vol. 13, No. 4, pp. 1304-1310 (Nov. 1998).

Ygge et al., "Decentralized Markets versus Central Control: A Comparative Study," Journal of Artificial Intelligence Research, vol. 11, Oct. 1999, pp. 301-333.

Ygge et al., "Making a Case for Multi-Agent Systems," Research Report 4/97, University of Karlskrona/Ronneby, Sweden 23 pages (also published as Ygge et al., "Making a Case for Multi-Agent Systems," In Multi-Agent Rationality, pp. 156-176, Springer Berlin Heidelberg (1997)).

Ygge, "Market-Oriented Programming and its Application to Power Load Management," Lund University, Ph.D. Thesis, 1998.

Ygge et al., "Power Load Management as a Computational Market," document not dated, 14 pages (published as Ygge et al., "Power Load Management as a Computational Marked," Proceedings of the 2nd International Conference on Multi-Agent Systems (ICMAS '96), pp. 393-400, (1996).

Yin et al., "A Novel Double Auction Mechanism for Electronic Commerce: Theory and Implementation," IEEE Proc. of the Third Int'l Conf. on Machine Learning and Cybernetics, pp. 53-58 (Aug. 2004).

Zarghami et al., "A novel approach to interarea oscillation damping by unified power flow controllers utilizing ultracapacitors," IEEE Trans. Power Syst., vol. 25, No. 1, pp. 404-412 (Feb. 2010).

Zhang et al., "A novel modal decomposition control and its application to PSS design for damping interarea oscillations in power systems," IEEE Trans. Power Syst., vol. 27, No. 4, pp. 2015-2025, (Nov. 2012).

Zhang et al., "Aggregated Modeling and Control of Air Conditioning Loads for Demand Response," IEEE Transactions on Power Systems, vol. 28, No. 4, pp. 4655-4664 (Nov. 2013).

Zhang et al., "Convergence Analysis of the Incremental Cost Consensus Algorithm Under Different Communication Network Topologies in a Smart Grid," IEEE Transactions on Power System, vol. 27, No. 4, pp. 1761-1768 (Nov. 2012).

Zhang et al., "Decentralizing the Economic Dispatch Problem using a Two-Level Incremental Cost Consensus Algorithm in a Smart Grid Environment," In 2011 North American Power Symposium (NAPS), IEEE, Aug. 4-6, 2011, 7 pages.

Zhang et al., "Design of wide-area damping controllers for interarea oscillations," IEEE Trans. Power Syst., vol. 23, No. 3, pp. 1136-1143, (Aug. 2008).

\* cited by examiner

600

| Recloser | Current Status* | New Status |
|---|---|---|
| R1 | 1 | 1 |
| R2 | 0 | 1 |
| R3 | 1 | 0 |
| R4 | 0 | 1 |
| R5 | 1 | 0 |
| R6 | 1 | 0 |
| R7 | 0 | 1 |

Status of 1 = closed, status of 0 = open

602

| DER | Power Generation Capability | New Status |
|---|---|---|
| DER1 | 6 kVA | Inject 6 kVA |
| DER2 | 5 kVA | Inject 5 kVA |
| DER3 | 9 kVA | Inject 7 kVA |
| DER4 | 12 kVA | Inject 5 kVA |
| DER5 | 12 kVA | Inject 5 kVA |

604

| Sequence | |
|---|---|
| Stage 1 | Open R6 |
| | Open R5 |
| | Command DER2 to inject 5 kVA |
| Stage 2 | Command DER1 to inject 6 kVA |
| | Close R7 |
| | Command DER4 to inject 5 kVA |
| | Command DER5 to inject 5kVA |
| | Close R4 |
| Stage 3 | Command DER3 to inject 7 kVA |
| | Close R2 |

| Recloser | Current Status* | Updated New Status |
|---|---|---|
| R1 | 1 | 1 |
| R2 | 0 | 0 |
| R3 | 1 | 0 |
| R4 | 0 | 0 |
| R5 | 1 | 0 |
| R6 | 1 | 0 |
| R7 | 0 | 1 |

Status of 1 = closed, status of 0 = open

802

| DER | Power Generation Capability | Updated New Status |
|---|---|---|
| DER1 | 6 kVA | Inject 6 kVA |
| DER2 | 5 kVA | Inject 1 kVA |
| DER3 | 9 kVA | Inject 7 kVA |
| DER4 | 12 kVA | Not used |
| DER5 | 12 kVA | Inject 5 kVA |

804

| Updated Sequence | |
|---|---|
| Stage 1 | Open R6 |
| | Open R5 |
| | Command DER2 to inject 1 kVA |
| Stage 2 | Command DER1 to inject 6 kVA |
| | Close R7 |
| | Command DER5 to inject 5kVA |
| Stage 3 | Command DER3 to inject 7 kVA |

FIG. 8

RECONFIGURATION OF POWER GRIDS DURING ABNORMAL CONDITIONS USING RECLOSERS AND DISTRIBUTED ENERGY RESOURCES

CROSS-REFERENCE TO RELATED APPLICATIONS

This application claims the benefit of U.S. Provisional Patent Application No. 62/754,792, filed Nov. 2, 2018, which application is incorporated herein by reference in its entirety.

ACKNOWLEDGMENT OF GOVERNMENT SUPPORT

This invention was made with government support under Contract DE-AC0576RL01830 awarded by the U.S. Department of Energy. The government has certain rights in the invention.

BACKGROUND

Existing power distribution systems (alternatively referred to herein as "power grids") are seeing deployment of an increasing number of utility-owned and customer-owned intelligent systems such as reclosers, microgrids, distributed automation, solar photovoltaic generation, behind-the-meter (BTM) energy storage, electric vehicles, etc. These systems can alternatively be referred to as distributed energy resources (DERs). While these deployments provide potential data and control points, the existing centralized control architectures for the power grids, referred to herein as distribution management systems (DMSs), do not have the flexibility or scalability to integrate the increasing number and variety of devices. For example, they are unable to access consumer-owned DERs that are BTM.

One aspect of distribution system management is the ability to reconfigure the network to maintain resiliency of critical end-use loads during abnormal conditions such as power grid outages. However, existing approaches for network reconfiguration in response to abnormal conditions do not take advantage of BTM DERs or distributed automation devices (e.g., recloser switches). Further, existing transactive frameworks for transacting power from BTM DERs pertain to normal grid conditions, and power supplied by DERs is valued differently during abnormal conditions such as grid outages.

SUMMARY

The foregoing and other objects, features, and advantages of the disclosed technology will become more apparent from the following detailed description, which proceeds with reference to the accompanying figures.

BRIEF DESCRIPTION OF THE DRAWINGS

FIG. 6 illustrates exemplary reconfiguration data for a power grid according to certain examples of the disclosed technology.

FIG. 8 illustrates exemplary updated reconfiguration data for a power grid according to certain examples of the disclosed technology.

DETAILED DESCRIPTION

I. General Considerations

Figure 1:
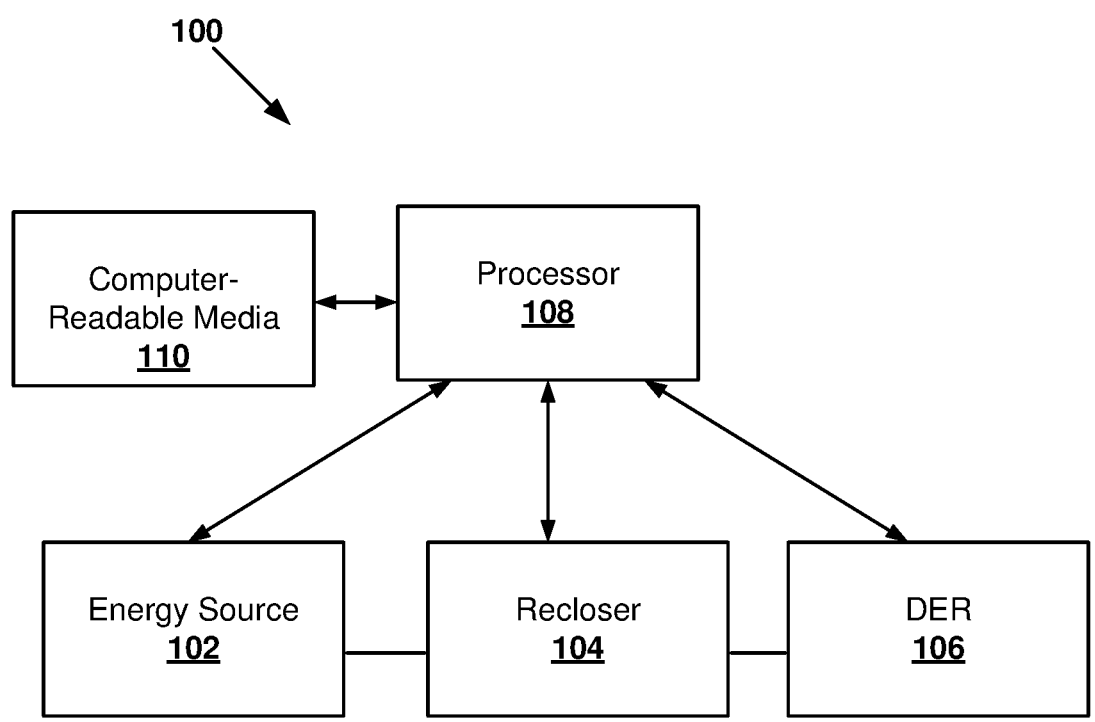
FIG. 1 illustrates an example environment in which certain apparatus and methods, including determination and implementation of a power grid reconfiguration, can be implemented according to the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "send," "transmit," and "perform" to describe the disclosed methods. These terms are high-level descriptions of the actual operations that are performed. The actual operations that correspond to these terms will vary depending on the particular implementation and are readily discernible by one of ordinary skill in the art. Further, as used herein, references to quantities or amounts of "power" when used without a modifier, are quantities of real, reactive, or apparent (real and reactive) power.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers. For example, as described herein, a voltage management planning and assessment tool can be implemented by a software application.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to an electrical device (or element) that is configured to interact with controllers and coordinators. For example, the integrated circuit can be embedded in or otherwise coupled to an inverter, as a controller of the inverter, in which case the inverter may be referred to as a "smart inverter."

II. Introduction to the Disclosed Technology

Methods and apparatus are disclosed for determining and implementing a reconfiguration for a power grid comprising reclosers and DERs responsive to abnormal conditions. Examples of DERs according to the disclosed technology include customer or third-party-owned PV systems and battery storage systems.

III. Example Environment for Reconfiguration and Restoration of a Power Grid

Figure 5:
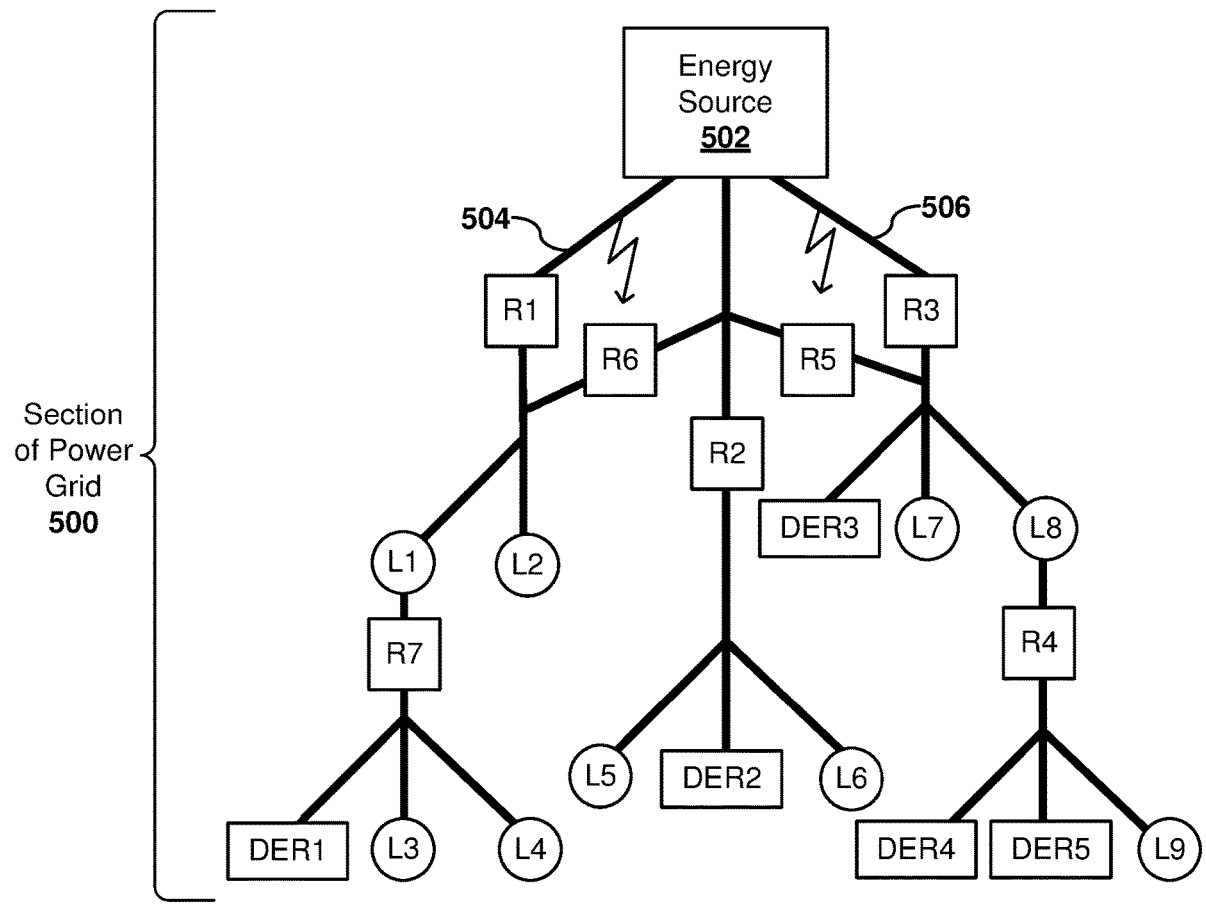
FIG. 5 is a diagram illustrating an example section of a power grid according to certain examples of the disclosed technology.

A diagram 100 illustrating an example environment for reconfiguration and restoration of a power grid in response to abnormal grid conditions is depicted in FIG. 1. As shown, the environment includes an energy source 102 electrically coupled to a recloser 104 and a DER 106, thereby forming a power grid. While a single energy source 102 is shown, the power grid can include a plurality of energy sources. Non-limiting examples of energy source 102 include a base load power plant (e.g., a coal, nuclear, or hydroelectric power plant), a peak load power plant (e.g., a gas or diesel turbine electric generator), a load balancing power plant (e.g., a pumped water storage or battery energy storage plant), and an intermittent load power plant (e.g., including PV and other solar-based electric generators, wind turbines, and tidal energy sources). Similarly, while a single recloser 104 and a single DER 106 are shown, the power grid can include any number of reclosers and DERs without departing from the scope of this disclosure. An example section of a power grid including a plurality of reclosers and DERs is shown in FIG. 5 and described below.

As shown, energy source 102, recloser 104, and DER 106 are each communicatively coupled with, and operable to submit data to and receive data from, a processor 108. Processor 108 in turn is communicatively coupled with, and operable to submit data to and receive data from, computer-readable media 110. Processor 108 and computer-readable media 110 can be used to implement a DMS, such as DMS 300 shown in FIG. 3 and described below. While a single processor 108 is shown in FIG. 1, a DMS can include multiple processors and other computing elements without departing from the scope of this disclosure. For example, a computing environment such as computing environment 200 of FIG. 2 can be communicatively coupled with the various energy sources, reclosers, DERs, and other components of a power grid.

The power grid can include one or more transmission lines ("feeders") that carry power from the energy source 102 to energy consumers (loads) as well as DERs such as DER 106 via one or more feeders electrically coupled thereto. The transmission lines can include reclosers, such as recloser 104, which can be alternatively referred to as recloser switches. Recloser 104 can have a status of "open" or "closed"; in other examples, however, the recloser can have additional statuses, such as partially open, partially closed, etc. When recloser 104 is open, power can flow through the feeder in which it is disposed without interruption. In contrast, when recloser 104 is closed, the flow of power in the feeder in which it is disposed is interrupted. While a single recloser is shown in FIG. 1, it will be appreciated that the power grid can include numerous reclosers, each of which can be opened or closed to open or close the supply of power to a corresponding section of the power grid.

The inclusion of reclosers in the power grid can allow for reconfiguration of the power grid in response to abnormal conditions, such as an extreme weather event, that causes a fault in one or more sections of the power grid. In particular, the reclosers can be individually controlled to alter the flow of power through the power grid to restore service of power to affected customers.

Various types of DERs can be included in the power grid without departing from the scope of this disclosure. In addition to supplying energy to the power grid, the DERs can also consume energy from the power grid, and thus can also be designated as "loads." For example, DER 106 can include a PV array electrically coupled to a feeder via an inverter. In this example, DER 106 can supply energy generated by the PV array to the power grid, and the inverter can convert DC power generated by the PV array to AC power, so that it can be supplied to the power grid. As another example, DER 106 can include an energy storage system (e.g., battery storage system) electrically coupled to a feeder via an inverter. The inverter can convert DC power stored in the energy storage system to AC power so that it can be supplied to the power grid. In other examples, other types of DERs configured to source or sink power can be included in the power grid.

The DERs of the power grid, such as DER 106, can include controllers operable to submit data to and receive data from other components of diagram 100. In some examples, one or more of the controllers are implemented using a microcontroller, memory, and suitable input/output resources for receiving signals carrying sensor data local to the DER and controlling the DER (e.g., by actuating switches/relays and other components of the DER). In other examples, the controllers can be implemented using programmable logic or a general-purpose computer configured to receiving signals carrying signal data and generate signals for controlling the DER. The controller of a given DER can be located at the DER, e.g., at a residence, industrial building, or commercial building that includes a PV plant and/or ESS and an inverter. The controller can be operably coupled to an inverter of the DER, and optionally to a PV plant and/or ESS of the DER, via a wired or wireless connection. In other examples, however, the controller of the DER can be located remotely, and can control operation of the DER and the components thereof (e.g., the inverter of the DER) by sending signals via a network (e.g., a wired or wireless network). The controller of a given DER can have a computer architecture similar to that illustrated in FIG. 2 and further discussed below.

The power grid can also include loads which are not DERs, such as the loads shown in FIG. 5 and described below. Such loads can consume energy received from the power grid, but are not configured to supply energy to the power grid. Examples of such loads include residential, commercial, or industrial properties that do not generate real or reactive power for supply to the power grid.

The communicative couplings shown in diagram 100 can occur via a wired or wireless computing network. For example, the network can be implemented as a local area network ("LAN") using wired networking (e.g., using IEEE standard 802.3 or other appropriate wired networking standard), fiber optic cable, cable modem (e.g., using the DOCSIS standard), and/or wireless networking (e.g., IEEE standards 802.11a, 802.11b, 802.11g, or 802.11n, Wi-Max (e.g., IEEE standard 802.16), a metropolitan area network ("MAN"), satellite networking, microwave, laser, or other suitable wireless networking technologies). In certain examples, at least part of the network can include portions of the internet or a similar public network. In certain examples, at least part of the network can be implemented using a wide area network ("WAN"), a virtual private network ("VPN"), or other similar public and private computer communication networks.

IV. Example Computing Environment

Figure 2:
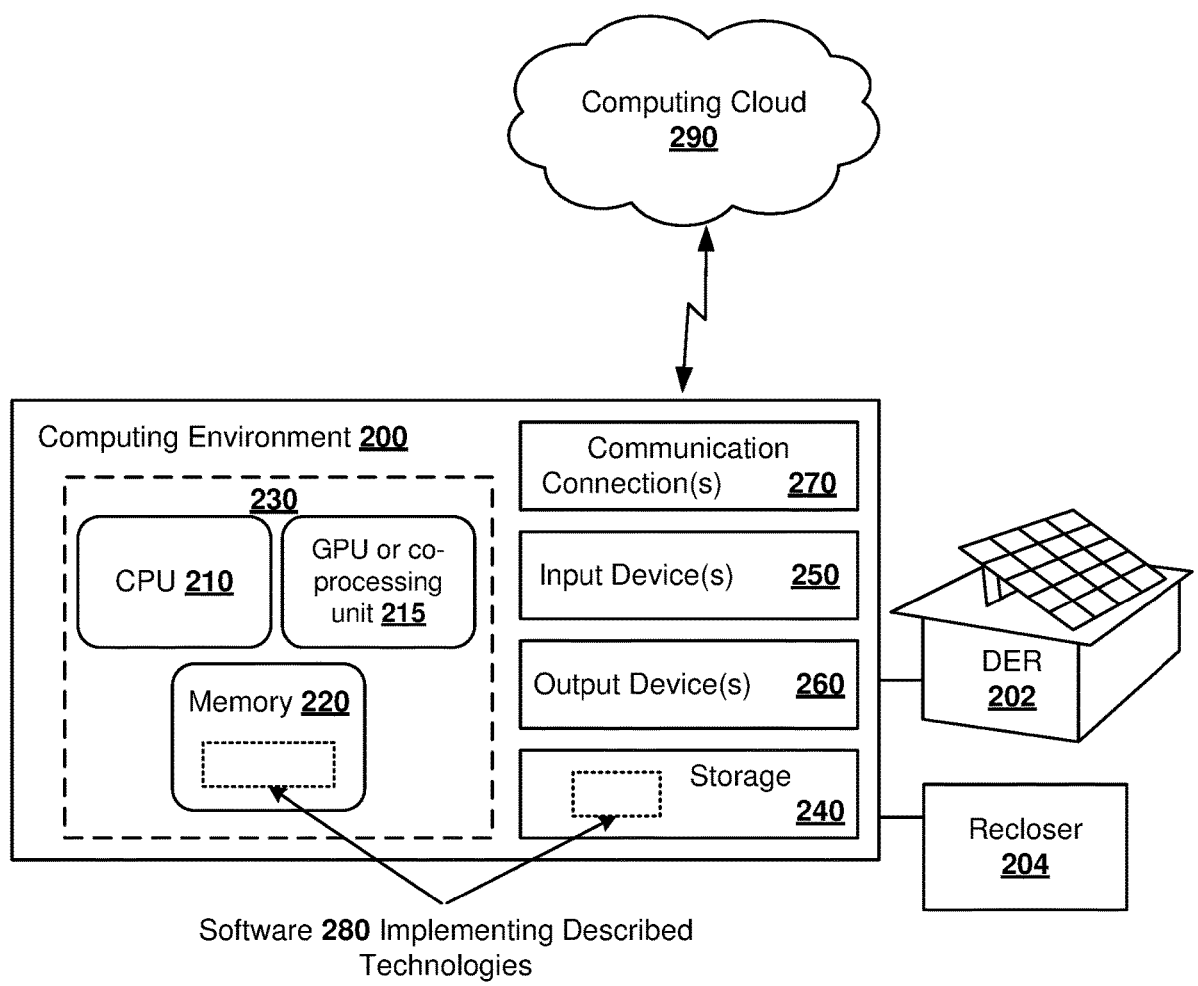
FIG. 2 is a diagram illustrating an example computing environment in which certain examples of the disclosed technology can be implemented.

FIG. 2 illustrates a generalized example of a suitable computing environment 200 in which described embodiments, techniques, and technologies can be implemented. For example, the computing environment 200 can implement any of a DER controller, a DMS, a solver of a DMS, and/or a transactive controller of the DMS, as described herein. For illustrative purposes, computing environment 200 is shown coupled to a DER 202, which may correspond to DER 106 of FIG. 1, for example, and a recloser 204, which may correspond to recloser 104 of FIG. 1, for example.

The computing environment 200 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 2, the computing environment 200 includes at least one central processing unit 210 and memory 220. In FIG. 2, this most basic configuration 230 is included within a dashed line. The central processing unit 210 executes computer-executable instructions and may be a real or a virtual processor. In a multi-processing system, multiple processing units execute computer-executable instructions to increase processing power and as such, multiple processors can be running simultaneously. A graphics processing unit (GPU) or co-processing unit 215 can also be included, as shown. The memory 220 may be volatile memory (e.g., registers, cache, RAM), non-volatile memory (e.g., ROM, EEPROM, flash memory, etc.), or some combination of the two. The memory 220 stores software 280, images, and video that can, for example, implement the technologies described herein. A computing environment may have additional features. For example, the computing environment 200 includes storage 240, one or more input devices 250, one or more output devices 260, and one or more communication connections 270. An interconnection mechanism (not shown) such as a bus, a controller, or a network, interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, CD-RWs, DVDs, or any other medium which can be used to store information and that can be accessed within the computing environment 200. The storage 240 stores instructions for the software 280, plugin data, and messages, which can be used to implement technologies described herein.

The input device(s) 250 may be a touch input device, such as a keyboard, keypad, mouse, touch screen display, pen, or trackball, a voice input device, a scanning device, or another device, that provides input to the computing environment 200. For audio, the input device(s) 250 may be a sound card or similar device that accepts audio input in analog or digital form, or a CD-ROM reader that provides audio samples to the computing environment 200. The output device(s) 260 may be a display, printer, speaker, CD-writer, or another device that provides output from the computing environment 200. The output device(s) 260 can also include interface circuitry for sending actuating commands. For example, when computing environment 200 implements a DER controller, the output device(s) can include interface circuitry for sending commands to activate or deactivate actuators (e.g., switches/relays, electric actuators such as solenoids, pneumatic actuators, etc.) of the DER (e.g., actuators of an inverter of the DER) which cause the DER to source or sink a desired amount of power, or to request sensor or other data from the DER. Similarly, when computing environment 200 implements a DMS, the output device(s) can include interface circuitry for sending commands to open or close reclosers of the power grid.

The communication connection(s) 270 enable communication over a communication medium (e.g., a connecting network) to another computing entity. The communication medium conveys information such as computer-executable instructions, compressed graphics information, video, or other data in a modulated data signal. The communication connection(s) 270 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed controllers and coordinators. Both wired and wireless connections can be implemented using a network adapter. In a virtual host environment, the communication(s) connections can be a virtualized network connection provided by the virtual host. In some examples, the communication connection(s) 270 are used to supplement, or in lieu of, the input device(s) 250 and/or output device(s) 260 in order to communicate with the DERs and reclosers of the power grid.

Some embodiments of the disclosed methods can be performed using computer-executable instructions implementing all or a portion of the disclosed technology in a computing cloud 290. For example, data acquisition and DER/recloser actuation can be performed in the computing environment, while some or all of the functionality of the solver and transactive controller of the DMS can be performed on servers located in the computing cloud 290.

Computer-readable media are any available media that can be accessed within a computing environment 200. By way of example, and not limitation, with the computing environment 200, computer-readable media include memory 220 and/or storage 240. As should be readily understood, the term computer-readable storage media includes the media for data storage such as memory 220 and storage 240, and not transmission media such as modulated data signals.

V. Example DMS

Figure 3:
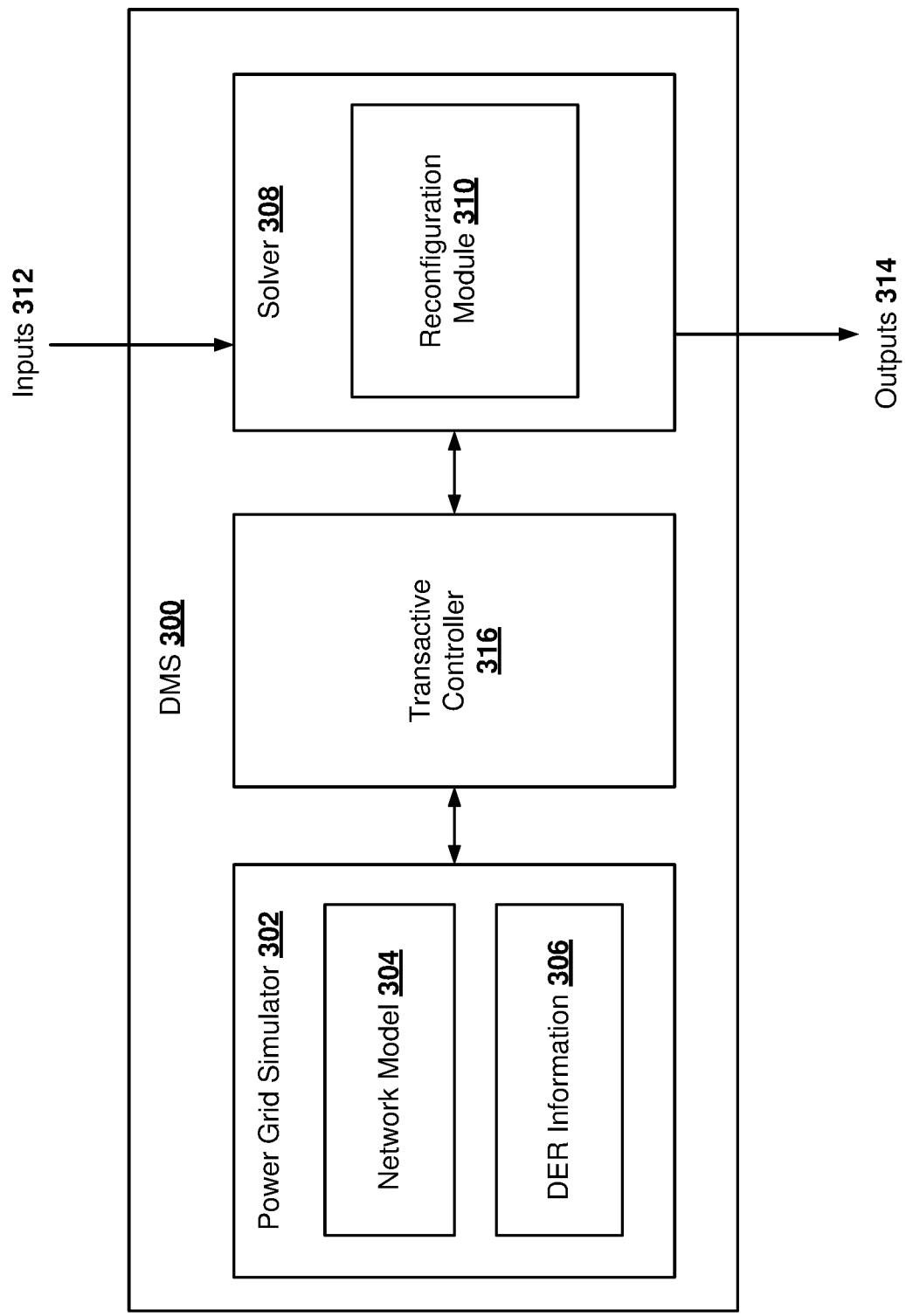
FIG. 3 is a diagram illustrating selected components, inputs, and outputs of a DMS of a power grid according to certain examples of the disclosed technology.

An example DMS 300 is depicted in FIG. 3. In some examples, DMS 300 is implemented by a utility and used to manage operation of a power grid under the jurisdiction of the utility. In such examples, DMS 300 is operable to submit data to and receive data from other components of the power grid via a computing network, as well as to perform operations on and otherwise process data. In one example, DMS 300 is implemented using a one or more microcontrollers, memory, and suitable input/output resources. In other examples, DMS 300 can be implemented using programmable logic.

As shown, DMS 300 includes a power grid simulator 302. In some examples, power grid simulator 302 is a software application implemented in a computing environment, such as GridLAB-D, which is configured to perform power distribution system simulation and analysis. Such tools can be configured to receive a plurality of inputs. In the depicted example, power grid simulator 302 utilizes a network model 304, which can be a computer model of at least a portion of the power grid managed by DMS 300. In particular, network model 304 can be a computer model suitable for detailed power flow analysis. In some examples, network model 304 can originate as a self-contained study (SXST) file, which is then converted into a GridLAB-D format before being provided as an input to power grid simulator 302.

Power grid simulator 302 further includes DER information 306. DER information 306 can include, for example, where the DERs are located within the power grid, respective capability curves for the DERs reflecting their power generation capabilities, sizes of the DERs, etc.

DMS 300 further includes a computer-implemented solver 308. In some examples, solver 308 can be implemented by a commercial solving tool such as the CPLEX Optimizer from IBM or the Gurobi Solver distributed by Gurobi Optimization. As shown, solver 308 can receive inputs 312 and produce outputs 314.

In addition to power grid simulator 302 and solver 308, DMS 300 includes a computer-implemented transactive controller 316. As described further below, transactive controller 316 can be configured to transact power (e.g., active and/or reactive power) from one or more DERs of the power grid.

As discussed below with reference to FIG. 4, responsive to abnormal conditions for the power grid such as an extreme weather event, a computer-implemented solver of a DMS such as solver 308 can determine a reconfiguration for the power grid (e.g., for a section of the power grid affected by the abnormal conditions) to increase the load served in that section of the power grid. The solver can then output the reconfiguration (e.g., in the form of various reconfiguration data) to a transactive controller of the DMS such as transactive controller 316. The transactive controller can then implement a transactive control scheme to attempt to transact quantities of power (e.g., active and/or reactive power) specified by the reconfiguration data from DERs of the power grid. Depending on the results of the transactive control scheme, the solver of the DMS may generate an updated reconfiguration reflecting the actual quantities of power that were transacted from the DERs. The DMS can then send signals to various actuatable components of the power grid, e.g. reclosers and DERs, that cause the components to operate in accordance with statuses specified in the updated reconfiguration. The signals can be sent in a sequence specified in the updated reconfiguration.

VI. Example Constraints and Objective Function for Determining a Reconfiguration A computer-implemented solver of a DMS, such as solver 308 of FIG. 3, can be configured to determine a reconfiguration for a section of a power grid (or alternatively, for an entire power grid) based on various constraints, using an objective function. Example constraints and objective functions that can be used by the solver are discussed below. The following Tables 1-3 define nomenclature used in the example constraints and objective functions.

TABLE 1

| Variable | Definition |
| --- | --- |
| B | Susceptance |
| G | Conductance |
| P | Real power flow |
| Q | Reactive power flow |
| V | Voltage magnitude |
| Y | Admittance matrix |
| δ | RCL status |

TABLE 2

| Index | Definition |
| --- | --- |
| i | Bus index |
| dem | Demand |
| g | Generator index |
| k | Load index |
| max | Maximum |
| min | Minimum |
| φ | Phase index |

TABLE 3

| Set | Definition |
| --- | --- |
| B | Set of all buses |
| G | Set of all generators |
| K | Set of all loads |
| φ$_i$ | Set of all phases at bus i |

The constraints used by the solver to determine the reconfiguration can include voltage constraints, generation constraints, power demand constraints, recloser switching constraints, power flow constraints. However, other constraints can also be used without departing from the scope of this disclosure.

Some of the constraints described below can be determined based on at least in part on status data for a plurality of reclosers of the power grid. Similarly, some of the constraints described below can be determined based at least in part on power generation capability data for a plurality of DERs of the power grid.

a. Voltage Constraints

The phase voltages for a bus can be resolved into a direct axis and a quadrature axis component:

$$V_i^\varphi = V_{id}^\varphi + jV_{iq}^\varphi, \forall i \in B, \forall \varphi \in \Phi i \quad (1)$$

Every bus in the section of the power grid can be restricted to be operate within a range of voltage magnitudes for safe and reliable operations:

$$(V_i^{min})^2 \le (V_{id}^\varphi)^2 + (V_{iq}^\varphi)^2 \le (V_i^{max})^2, \forall i \in B, \forall \varphi \in \Phi i \quad (2)$$

b. Generation Constraints

The amount of power generation available at each node of the section of the power grid can be described in terms of both real and reactive power as:

$$P_{g,i}^{min} \le P_{g,i}^\varphi \le P_{g,i}^{max}, \forall i \in B, \forall \varphi \in \Phi i \quad (3)$$

$$Q_{g,i}^{min} \le Q_{g,i}^\varphi \le Q_{g,i}^{max}, \forall i \in B, \forall \varphi \in \Phi i \quad (4)$$

In some examples, the amount of power generation available at each node includes power that can be generated by DERs of the power grid. In such examples, the generation constraints can be determined based at least in part on power generation capability data for one or more DERs of the power grid.

c. Power Demand Constraints

Each bus of the section of the power grid can be associated with a demand in load expressed in terms of both real and reactive power as:

$$P_{k,i}^\varphi \le P_{k,i}^{dem}, \forall i \in B, \forall \varphi \in \Phi i \quad (4)$$

$$Q_{k,i}^\varphi \le Q_{k,i}^{dem}, \forall i \in B, \forall \varphi \in \Phi i \quad (4)$$

d. Recloser Switching Constraints

Recloser switches located between two buses of the section of the power grid can be assigned a status of 1 if closed and 0 if open:

$$\delta_{ih} \begin{cases} \in \{0, 1\} \text{ if } \exists \text{ recloser between } i \text{ and } h \\ = 1 \text{ if } \nexists \text{ recloser between } i \text{ and } h \end{cases} \forall i, h \in B \quad (7)$$

e. Power Flow Constraints

The admittance between two buses i and h of the section of the power grid can be denoted by:

$$Y_{ih} = G_{ih} + jB_{ih}$$

The three-phase power flow constraints are given by:

$$P_{g,i}^\varphi - P_{k,i}^\varphi = V_{id}^\varphi \sum_{h \in B}(G_{ih}^{\varphi\tilde{\varphi}}V_{hd}^{\tilde{\varphi}} - B_{ih}^{\varphi\tilde{\varphi}}V_{hq}^{\tilde{\varphi}}) + V_{iq}^\varphi \sum_{h \in B}(B_{ih}^{\varphi\tilde{\varphi}}V_{hd}^{\tilde{\varphi}} - G_{ih}^{\varphi\tilde{\varphi}}V_{hq}^{\tilde{\varphi}}), \quad (8)$$

$$\forall i \in B, \forall \varphi, \tilde{\varphi} \in \Phi i$$

-continued $$Q_{g,i}^{\varphi} - Q_{k,i}^{\varphi} = V_{id}^{\varphi} \sum_{h \in B} (-B_{ih}^{\varphi\bar{\varphi}} V_{hd}^{\bar{\varphi}} - G_{ih}^{\varphi\bar{\varphi}} V_{hq}^{\bar{\varphi}}) + V_{iq}^{\varphi} \sum_{h \in B} (G_{ih}^{\varphi\bar{\varphi}} V_{hd}^{\bar{\varphi}} - B_{ih}^{\varphi\bar{\varphi}} V_{hq}^{\bar{\varphi}}), \quad (9)$$

$$\forall i \in B, \forall \varphi, \bar{\varphi} \in \Phi i$$

The status of recloser switches changes the network conductance and susceptance affecting the power flow constraints. Therefore, for the transmission lines of the section of the power grid that contain a recloser, the susceptance and conductance are a function of the recloser status.

$$G_{ii} = \sum_{l \neq h, l \in B} g_{il} + \delta_{ih} g_{ih} \quad (10)$$

$$B_{ii} = \sum_{l \neq h, l \in B} b_{il} + \delta_{ih} b_{ih} \quad (11)$$

$$G_{ih} = -\delta_{ih} g_{ih} \quad (12)$$

$$B_{ih} = -\delta_{ih} b_{ih} \quad (13)$$

where $g_{ih}$ and $b_{ih}$ are the branch susceptance and the branch conductance connecting buses i and h. Accordingly, the power flow constraints can be determined based on at least in part on status data for one or more reclosers of the power grid.

f. Objective Function

An objective function can be used to obtain a reconfiguration of the feeders that achieves a particular objective. In some examples, the objective is to increase the load served. Alternative objectives can include increasing the number of loads (e.g., customers) served, reducing power loss, or increasing cost-effectiveness of the system.

Example decision variables for the objective function can include the recloser switch statuses, the generation at each bus, the bus voltages, and the load served at each bus. In one non-limiting example, the following objective function can be used:

$$\text{Maximize } J = \sum_{\forall k,i} P_{k,i} \quad (14)$$

The above objective function can be subject to the constraints described above in equations (2)-(13). In above objective function, J represents the load served by the reconfigured section of the power grid, and the solution to the objective function maximizes J. In some examples, maximizing J refers to finding a global maximum of the objective function, whereas in other examples, maximizing J refers to finding a local maximum of the objective function. In other examples, rather than maximizing J, an improved solution for J is sought that is scored using the objective function. A heuristic can be optionally be used to find an improved solution for J. Sometimes, the objective function can be used to find an improvement to J that is subject to a time limit. In other examples, the objective function can be used to find an improvement to J that exceeds a threshold amount (e.g., an increase in the load served by the reconfigured section of the power grid that exceeds a threshold amount). It will be appreciated that other objective functions can also be used without departing from the scope of this disclosure.

Various methods can be used by the solver to find an improved solution using an objective function such as that specified in equation (14) above. For example, the solver can use iterative methods incorporating one or more of linear programming, quadratic programming, branch and bound, and stochastic methods. Possible stochastic methods used by the solver can include Monte Carlo or simulated annealing approaches, gradient descent, and Newton's method.

VII. Example Reconfiguration of Power Grid Via DMS

Figure 4:
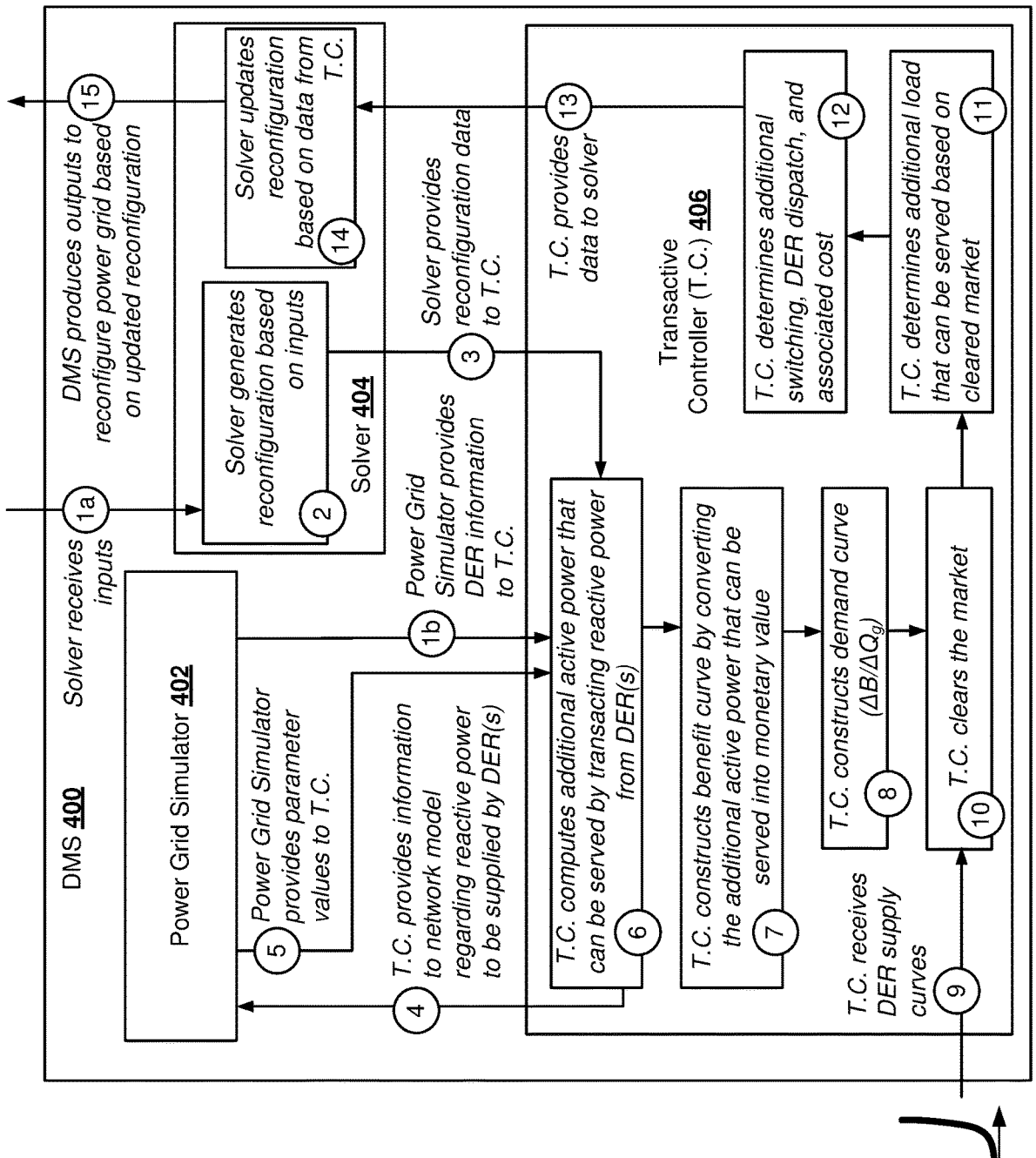
FIG. 4 is a diagram illustrating actions performed by selected components of a DMS to reconfigure a power grid responsive to abnormal grid conditions according to certain examples of the disclosed technology.

An example reconfiguration of a power grid (e.g., a section of a power grid) performed by a DMS 400 is depicted in FIG. 4. DMS 400 can correspond to DMS 300 of FIG. 3, for example. Similar to DMS 300, DMS 400 includes a power grid simulator 402, which can include a network model and DER information as discussed above for power grid simulator 302 of FIG. 3. Further, similar to DMS 300, DMS 400 includes a solver 404, which can include a reconfiguration module as discussed above for solver 308 of FIG. 3. Similar to solver 308, solver 404 is configured to receive various inputs and produce various outputs. DMS 400 further includes a transactive controller 406, which can correspond to transactive controller 316 of FIG. 3, and which can be configured to receive various inputs and produce various outputs, as discussed further below. References to a "power grid" in this section can equally refer to a section of power grid, depending on whether an entire power grid or a section of a power grid is to be reconfigured. The example reconfiguration shown in FIG. 4 involves transacting reactive power from DERs; in other examples, real power alone, or both real power and reactive power, can be transacted from DERs without departing from the scope of this disclosure.

An overview of exemplary actions performed to determine and implement a reconfiguration of a power grid are indicated by the circled numbers 1-15 in FIG. 4. In particular, the circled numbers are used to depict stages of a sequence in which the actions occur. While the stages are described in a particular sequential order for illustrative purposes, it should be understood that stages can be combined, stages can be omitted, the order of stages can be changed, and/or new stages may be present depending on the specific implementation At stage 1*a*, solver 404 receives inputs. While depicted as being received from external to the DMS, the inputs can alternatively be received from another component of the DMS, such as the power grid simulator, or from a combination of sources. In some examples, some or all of the inputs can be input to the DMS by a user. The received inputs can include values of variables such as those defined in Section VI above, and/or values of other variables such as $P_L$ (real power flow associated with loads of the power grid), $Q_L$ (reactive power flow associated with loads of the power grid), $P_G$ (real power flow associated with generators of the power grid), $Q_G$ (reactive power flow associated with generators of the power grid), $P_g^{min}$ (minimum real power flow associated with a specific generator), $P_g^{max}$ (maximum real power flow associated with a specific generator), $I_R$ (current), $V^{min}$ (minimum voltage magnitude at one or more nodes), $V^{max}$ (maximum voltage magnitude at one or more nodes), and/or $Y_{bus}$ (admittance matrix for buses of the power grid). The solver can use the inputs to populate constraints, such as those defined in equations (2)-(13)

above. Optionally, the inputs can also include an objective function such as the objective function defined in equation (14) above.

At stage 1*b*, power grid simulator 402 provides DER information to transactive controller 406. The DER information can include, but is not limited to, where the DERs are located within the power grid, respective capability curves for the DERs reflecting their power generation capabilities, sizes of the DERs, etc. In some examples, stage 1*b* occurs after stage 1*a*, whereas in other examples stage 1*b* occurs prior to stage 1*a*. Alternatively, stages 1*a* and 1*b* can occur at approximately the same time.

At stage 2, solver 404 generates a reconfiguration based on the inputs. For example, the solver can generate reconfiguration data based on constraints using an objective function, as discussed above in Section VI. In some examples, the reconfiguration is generated by a reconfiguration module of the solver, such as reconfiguration module 310 of FIG. 3. The reconfiguration can include, for example, reconfiguration data specifying respective new statuses (e.g., open or closed) one or more reclosers of the power grid, respective new statuses for one or more DERs of the power grid (which can include respective quantities of real, reactive, or apparent power to be supplied to the power grid by the DER(s)), a sequence in which to change the status of the recloser(s) in accordance with the respective new statuses, and/or a sequence in which to change the status of the DER(s) in accordance with the respective new statuses. The reconfiguration data can also optionally include data specifying new statuses for other actuatable components of the power grid (e.g., components other than reclosers and DERs), and/or data specifying new parameter values at one or more nodes of the power grid (e.g., bus voltages). An example reconfiguration is discussed in Section IX below with reference to FIG. 6.

At stage 3, solver 404 provides reconfiguration data generated at stage 2 to transactive controller 406. In some examples, the solver provides only reconfiguration data that is relevant for transacting power from DERs to the transactive controller. In other examples, however, data specifying the entire reconfiguration can be provided to the transactive controller.

At stage 4, transactive controller 406 provides information regarding reactive power to be supplied by the DER(s) to power grid simulator 402, and in particular to the network model of the power grid simulator. For example, the information provided to the power grid simulator at stage 4 can include some of the reconfiguration data, such as reconfiguration data specifying respective quantities of power for one or more DER(s) to supply to the power grid.

At stage 5, power grid simulator 402 provides parameter values to transactive controller 406. The parameter values can include voltages, currents, and powers at various nodes of the power grid and from DERs.

At stage 6, transactive controller 406 computes additional active power (e.g., additional loads) that can be served by transacting reactive power from one or more DERs of the power grid. This can include creating a curve mapping additional load that can be restored to reactive power injection from DER(s) for the power grid. The computation of additional active power that can be served by transacting reactive power from one or more DERs of the power grid can be based at least in part on the reconfiguration data received from the solver at stage 3, the DER information received from the power grid simulator at stage 1*b*, and/or the parameter values received from the power grid simulator at stage 5.

At stage 7, transactive controller 406 constructs a benefit curve by converting the additional active power that can be served computed at stage 6 into monetary value. The valuation of the additional loads that can be served can be determined based at least in part on a loss of energy revenue due to not being able to serve the loads, a cost of Energy Not Served (ENS), and a cost of Demand Not Served (DNS). By assigning the monetary value, an "additional restored load vs. reactive power injections from DERs" curve created at stage 6 can be translated into what can be referred to as a benefit curve.

Figure 7:
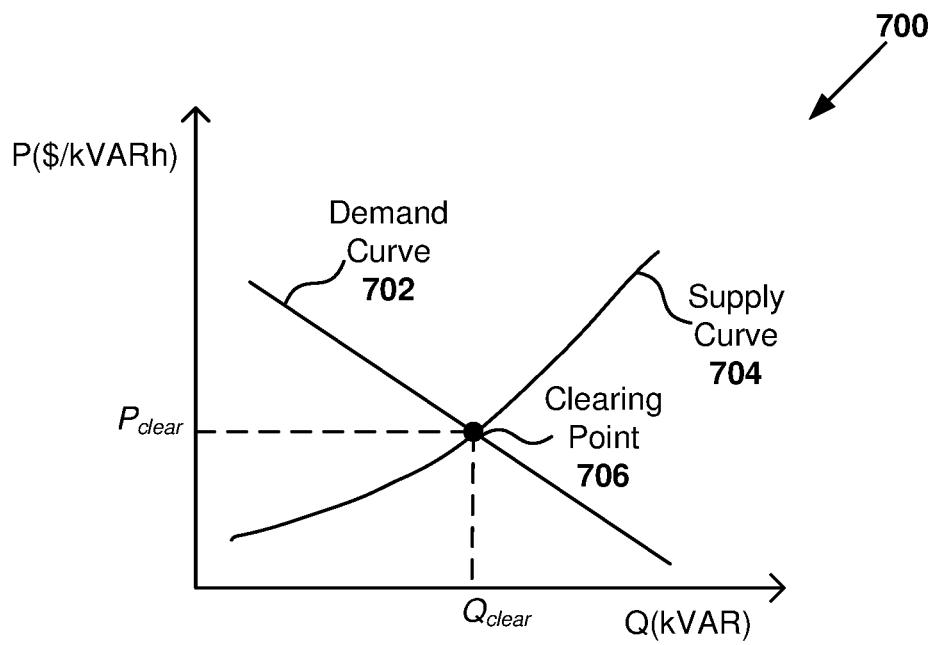
FIG. 7 illustrates an example of market clearing for reactive power according to certain examples of the disclosed technology.

At stage 8, transactive controller 406 constructs a demand curve, which can alternatively be referred to as a marginal cost curve. To construct the demand curve, the transactive controller can differentiate differentiating the benefit curve obtained at stage 7 with respect to the commodity to be transacted (e.g., reactive power from one or more DERs). An example demand curve is shown in FIG. 7 and described in Section X below.

At stage 9, transactive controller 406 receives supply curves from one or more DERs of the power grid. This can include the transactive controller receiving data from respective controllers of the one or more DERs, for example, the data including supply curves for the DER(s). The supply curve for a given DER can be determined by a controller of the DER, or by another entity, based at least in part on factors such as the operating point of the DER, a degradation cost representing wear and tear, losses on the system, and a cost of active power curtailments. After receiving the supply curves from the DERs, the transactive controller can aggregate the supply curves into a single aggregated DER supply curve. Alternatively, the transactive controller can receive an aggregated DER supply curve that was aggregated by another entity from individual DER supply curves. An example supply curve, which can be a supply curve for a single DER or an aggregated DER supply curve, is shown in FIG. 7 and described in Section X below.

At stage 10, transactive controller 406 performs market clearing. This can include the transactive controller implementing a double auction market using the demand curve and aggregated DER supply curve to compute respective cleared quantities of reactive power to be supplied by one or more of the DERs to the power grid and a corresponding market price for reactive power. An example of market clearing is shown in FIG. 7 and described in Section X below.

At stage 11, transactive controller 406 determines an amount of additional load that can be served based on the market clearing performed at stage 10. Put another way, the transactive controller determines an economically justified amount of reactive power to be supplied by the DER(s) that can be used for improved service restoration). In some examples, the amount of additional load that can be served is consistent with reconfiguration determined by the solver (e.g., in examples where the transactive controller successfully transacted the quantities of power specified in the reconfiguration data from the corresponding DERs). In other examples, the amount of additional load that can be served is less than the amount that would have been served in accordance with the reconfiguration (e.g., in examples where the transactive controller was unable to successfully transact some or all of the quantities of power specified in the reconfiguration data from the corresponding DERs).

At stage 12, transactive controller 406 determines additional switching, DER dispatch, and associated costs. For example, based on the network topology and criticality of the loads, the additional load that can be served as determined at stage 11 can be translated into additional switching operation at stage 12 for improved service restoration, reliability, and resiliency.

At stage 13, transactive controller 406 provides data to solver 404. This data can include, for example, data indicating results of the transactive controller's attempts to transact respective quantities of power (e.g., reactive power) from one or more DER(s) in accordance with the reconfiguration data. The results can optionally indicate, for each DER, the quantity of power (if any) that was successfully transacted from that DER, and whether it matches the quantity of power specified in the reconfiguration data for that DER. The data provided to the solver can further include the additional switching, DER dispatch, and associated cost information determined at stage 12.

At stage 14, solver 404 updates the reconfiguration (e.g., the reconfiguration generated at stage 2) based on the data received from transactive controller 406. For example, this can include modifying reconfiguration data such new statuses for reclosers to updated new statuses and/or modifying new statuses for DERs to updated new statuses. An example updated reconfiguration is discussed in Section XI below with reference to FIG. 8.

At stage 15, the DMS produces outputs to reconfigure the power grid based on the updated reconfiguration. As shown, the outputs can then be provided to one or more DERs and/or one or more reclosers of the power grid. For example, the outputs can be provided to the DER(s) and/or recloser(s) in the form of signals that cause the DER(s) and/or recloser(s) to change their statuses to updated new statuses in accordance with the updated reconfiguration. Optionally, the outputs can also include signals sent to other power grid components (e.g., an energy source of the power grid such as energy source 102 of FIG. 1) that cause the other power grid components to modify their operation.

VIII. Example Section of Power Grid

An example section 500 of a power grid is depicted in FIG. 5. Section 500 includes an energy source 502, which can correspond to energy source 102 of FIG. 1, for example. Section 500 further includes a plurality of feeders, including feeders 504 and 506, a plurality of reclosers (R1, R2, R3, R4, R5, R6, and R7), a plurality of DERs (DER1, DER2, DER3, DER4, and DER5), and a plurality of loads (L1, L2, L3, L4, L5, L6, L7, L8, and L9). The reclosers can correspond to recloser 104 of FIG. 1, for example, and the DERs can correspond to DER 106 of FIG. 1, for example.

In the depicted example, faults in feeders 504 and 506 have caused abnormal grid conditions in the power grid. A DMS such as DMS 300 of FIG. 3 can determine, updated (if needed), and implement a reconfiguration of the power grid responsive to the abnormal grid conditions, for example in the manner discussed above with reference to FIG. 4. A specific example of a reconfiguration that can be determined by a DMS managing the power grid for section 500 of the power grid is shown in FIG. 6 and described below. Further, a specific example of an update to the reconfiguration of FIG. 6 is shown in FIG. 8 and described in Section XI below.

It will be appreciated that section 500 and the corresponding example reconfiguration and updated reconfiguration and provided for illustrative purposes only, and are not meant to be limiting.

IX. Example Reconfiguration for Power Grid

A DMS managing the power grid including section 500 of FIG. 5 can determine a reconfiguration for the power grid responsive to detection or anticipation of abnormal grid conditions. An example of some aspects of such a reconfiguration is shown in FIG. 6. In particular, FIG. 6 depicts a table 600 of current and new statuses for the reclosers of section 500, a table 602 of power generation capabilities and new statuses for the DERs of section 500, and a table 604 providing a sequence in which to cause the reclosers to transition to their respective new statuses and to command the DERs to operate in accordance with their respective new statuses.

In the depicted example, the faults in feeders 504 and 506 of section 500 have already triggered reclosers R1 and R3 to close. Accordingly, as shown in table 600, the current status of each of R1 and R3 is 1, indicating that these reclosers are closed. Reclosers R5 and R6 are normally closed and also have a current status of 1, having not been triggered by the faults. Reclosers R2, R4, and R7 are normally open and were not triggered by the faults; accordingly, the current status of each of R2, R4, and R7 is 0, indicating that these reclosers are open.

Responsive to detection of the faults, a reconfiguration was determined by a solver of the DMS managing section 500 (e.g., in the manner discussed above with reference to FIG. 4). The reconfiguration includes, among other data, the new statuses for the reclosers of section 500 that are shown in table 600. Recloser R1 has a new status of 1, and thus remains closed. Reclosers R2, R4, and R7 have new statuses of 1, indicating that they should transition from open to closed. Reclosers R3, R5, and R6 have new statuses of 0, indicating that they should transition from closed to open.

The reconfiguration further includes new statuses for the DERs of section 500. Table 602 depicts these new statuses, along with the power generation capabilities of the DERs. As discussed above with reference to FIG. 4, the power generation capabilities of the DERs can factor into generation constraints, which in turn can serve as bases for the determination of the reconfiguration. In the depicted example, DER1 is capable of generating 6 kVA, DER2 is capable of generating 5 kVA, DER3 is capable of generating 9 kVA, and each of DER4 and DER5 are capable of generating 12 kVA. While the power generation capability is expressed in terms of apparent power (VA) in the depicted example, reactive power (VAR) alone may instead be considered in other examples.

As shown in table 602, the new statuses for the DERs included in the reconfiguration are as follows: DER1 is to inject 6 kVA, DER2 is to inject 5 kVA, DER3 is to inject 7 kVA, and DER4 and DER5 are each to inject 5 kVA.

Optionally, the reconfiguration also includes a sequence in which the DMS should cause the reclosers to transition to their respective new statuses and command the DERs to operate in accordance with their respective new statuses. An example of such a sequence is depicted in table 604. At stage 1, the sequence includes opening R6 and R5 and commanding DER2 to inject 5 kVA to the power grid. Opening R6 can allow power to flow from energy source 502 to the loads downstream of closed recloser R1, i.e., loads L1, L2, L3, and L4, as well as to DER1. Similarly, opening R5 can allow power to flow from energy source 502 to the loads downstream of closed recloser R3, i.e., loads L7, L8, and L9, as well as to DER3, DER4, and DER5. Further, commanding DER2 to inject 5 kVA to the power grid serves to provide additional power to be supplied to all of the loads, to supplement the reduction in power supplied to the loads due to the faults in feeders 504 and 506.

At stage 2, the sequence includes commanding DER1 to inject 6 kVA to assist with power supply to loads L3 and L4, and closing recloser R7 (as DER1 can now adequately serve L3 and L4). In addition, at stage 2, the sequence includes commanding DER4 and DER5 to inject 5 kVA each to assist with power supply to load L9, and closing recloser R4 (as DER4 and DER5 can now adequately serve L9).

Next, at stage 3, the sequence includes commanding DER3 to inject 7 kVA to assist with power supply to loads L1, L2, L7, and L8, and closing recloser R2. Recloser R2 can be closed at this point as DER2 alone can adequately serve loads L5 and L6.

The reconfiguration data shown in FIG. 6 is provided as an example only, and is not meant to be exhaustive. Other data can also be specified in a reconfiguration without departing from the scope of this disclosure. For example, a reconfiguration can also include data specifying new statuses for other actuatable components of the power grid, and/or data specifying new parameter values at one or more nodes of the power grid (e.g., bus voltages).

As discussed above with reference to FIG. 4, whether the reconfiguration will be implemented will depend on the ability of the DMS (e.g., the transactive controller of the DMS) to transact the specified quantities of power from the DERs. As discussed below with reference to FIG. 7, the DMS may perform a double auction market clearing process to attempt to transact the specified quantities of power from the DERs.

X. Example Transactive Market Clearing

A double auction refers to a market clearing process in which exchanging entities (e.g., the buyers and sellers) simultaneously submit their bids to exchange a commodity. The bids and offers typically constitute price-quantity pairs, specifying the amount of a commodity to be exchanged at a desired price. In some examples, the desired price need not be expressed in units of currency, but can be expressed in other units mutually-agreeable to the exchanging entities, and including the exchange of tangible commodities (e.g., stored energy, future deliveries of energy, credits, stored power, etc.). In some examples, the bids and offers may consist of a single price-quantity (P-Q) pair, or multiple such pairs, which form the supply and demand curves. Buyers' P-Q pairs contain information on their willingness to pay (WTP), which is the maximum amount of money they are willing to pay for the corresponding amount of commodity. Hence, the P-Q pair, and by extension the demand curve, contain information on buyers' preferences to consume the commodity. A buyer's demand curve is also referred to as the marginal benefit curve, because WTP for an incremental unit of a commodity represents the additional utility (and hence, marginal benefit) from consuming it. Similarly, sellers' P-Q pairs contain information on their willingness to accept (WTA), which is the minimum amount of money they are willing to accept for the corresponding amount of the commodity. Hence, the P-Q pairs contain information on sellers' implied costs to produce the commodity. It is reasonable to assume that most sellers operate with a profit motive, and hence, their WTA for a given amount of commodity must be greater than the production cost. In case of a purely competitive marketplace, and auction designs such as uniform price auctions, the sellers have no incentive to report anything but their true marginal production costs, and hence, the supply curve is the same as the marginal cost curve.

At the market clearing point, the buyers' WTP equals the sellers' WTA. The market clearing transaction occurs at the intersection of the demand and supply curves, revealing the market clearing price and the amount of commodity to be transacted. At the market clearing point, the buyers' WTP equals the sellers' WTA. An exemplary market clearing transaction for reactive power is shown in diagram 700 of FIG. 7, in which a demand curve 702 intersects with a supply curve 704 at a clearing point 706. Clearing point 706 can also be represented as a P-Q pair, in which the price is the clearing price $P_{clear}$ for reactive power and the quantity of reactive power to be transacted is the clearing quantity $Q_{clear}$. It will be appreciated that a similar market clearing transaction can be performed for other types of power, e.g., real power or apparent power.

Double auction transactive energy systems have been used in both distribution and bulk-power systems to engage resources to help achieve various operational requirements of the power system. The specification of a transactive system begins with the identification of a desired operational objective (use case) to be achieved, such as management of voltage within the American National Standards Institute (ANSI) bounds on a distribution feeder. Once a use case has been identified, the next step involves specification of the commodity to be transacted along with its units of measurement and transaction, as well as identification of the counterparties—buyers and sellers. For instance, a distribution utility could transact with customer or third-party owned assets, such as inverters, to source or sink reactive power to manage the voltage on a distribution feeder. In this case, the commodity to be transacted is reactive power, and the buyer is a distribution utility. The next step involves translation of the desired operational objective into a transactive incentive signal, which is expressed using the same financial units as the seller's reported offer. In the context of a double auction market, a transactive incentive signal represents the maximum price a distribution utility is willing to pay for the commodity, e.g., its demand or marginal benefit curve. The seller's cost for providing the commodity could be either the direct cost associated with production, or a cost based on implied or assumed trade-offs with other monetizable commodities.

In the context of the present disclosure, a computer-implemented transactive controller, such as transactive controller 316 of FIG. 3, can implement a double auction market transactive control scheme in order to transact desired quantities of power from one or more DER(s) of the power grid. In some examples, the power transacted from the DERs is reactive power in particular. Additionally or alternatively, the transactive controller can transact real and/or apparent power from the DERs.

Towards this end, the transactive controller can produce a demand curve reflecting a willingness of the entity operating the power grid (e.g., utility) to pay DERs in exchange for the DERs providing power support to the power grid (e.g., sourcing or sinking a desired amount of power). In some examples, the demand curve is generated in the manner discussed in Section VII above with reference to FIG. 4. Alternatively, the demand curve can be generated based on bid data, the bid data including a plurality of P-Q pairs or a demand curve generated based on a plurality of P-Q pairs.

Further, the transactive controller can receive data from one or more DERs (e.g., from respective controllers of one or more DERs). The received data can include, for example, respective supply curves or offer data for the DERs. Offer data for a given DER can reflect the DER's willingness to supply power to the power grid, and can optionally include a plurality of P-Q pairs or a supply curve generated based on a plurality of P-Q pairs. Based on the received data, the transactive controller can generate an aggregated DER supply curve. In other examples, however, another component of the DMS or another entity can generate the aggregated supply curve and provide it to the transactive controller.

Once the transactive controller has obtained the demand curve and aggregated DER supply curve, the intersection point of these curves can be found and used to determine the clearing price and quantity for the commodity to be transacted, for example in the manner discussed above with reference to FIG. 7. Depending on the clearing price and quantity, it may or may not be necessary for the solver of the DMS to update the reconfiguration, as discussed in Section VII above with reference to FIG. 4. Ultimately, instructions to source or sink a specified amount of power can be transmitted from the DMS to the DERs which will be providing the power to the power grid. Controllers of the DERs can respond to the instructions by, for example, actuating their inverters to source or sink a specified amount of power to/from the power grid.

XI. Example Updated Reconfiguration for Power Grid

After performing transactive market clearing, the DMS can determine an updated reconfiguration for section 500 of the power grid. An example of some aspects of such an updated reconfiguration is shown in FIG. 8. In particular, FIG. 8 depicts a table 800 of current and updated new statuses for the reclosers of section 500, a table 802 of power generation capabilities and updated new statuses for the DERs of section 500, and a table 804 providing an updated sequence in which to cause the reclosers to transition to their respective new statuses and to command the DERs to operate in accordance with their respective new statuses.

In the depicted example, transactive market clearing was performed by a computer-implemented transactive controller, e.g. in the manner discussed above with reference to FIG. 7. The market clearing was successful for DER1, DER3, and DER5, and thus the respective quantities of power to be supplied by these DERs specified in the original reconfiguration (i.e., in table 602 of FIG. 6) were successfully transacted. In contrast, it was only possible to transact 1 kVA from DER2 at the clearing price, rather than the 5 kVA specified in the original reconfiguration. Further, it was not possible to transact any power from DER4 at the clearing price. In this scenario, it may be appropriate for the DMS (e.g., the computer-implemented solver of the DMS) to generate an updated reconfiguration reflecting the actual results of the transactive market clearing. Such an updated reconfiguration is shown in FIG. 8.

The current recloser statuses shown in table 800 correspond to those shown in table 600 of FIG. 6. However, in contrast to table 600, table 800 also shows updated new statuses for the reclosers which reflect updates to the reconfiguration in view of the actual results of the transactive market clearing. The updated new statuses of reclosers R1, R3, R5, R6, and R7 are the same as the new statuses of these reclosers shown in table 600, as the updates to the reconfiguration do not necessitate any changes. In contrast, whereas the new status of recloser R2 determined in the original reconfiguration was 1 (closed), the updated new status of R2 is 0 (open), as shown in table 800. R2 is kept open in the updated reconfiguration because the actual quantity of power transacted from DER2 in the transactive market clearing, 1 kVA, is not adequate to serve loads L5 and L6. Thus, recloser R2 is kept open to allow additional power to be supplied to L5 and L6 from elsewhere in the power grid. Similarly, whereas the new status of recloser R4 determined in the original reconfiguration was 1 (closed), the updated new status of R4 is 0 (open), as shown in table 800. R4 is kept open in the updated reconfiguration because it was not possible to transact any power from DER4 in the transactive market clearing, and DER5 is unable to adequately serve load L9 on its own. Thus, R4 is kept open in the updated reconfiguration to allow additional power to be supplied to L9 from elsewhere in the power grid.

Table 802 depicts the updated new statuses of the DERs along with the power generation capabilities of the DERs. The power generation capabilities of the DERs shown in table 802 correspond to those shown in table 602 of FIG. 6. While the updated new statuses for DER1, DER3, and DER5 are unchanged relative to the new statuses shown in table 602 of FIG. 6, the updated new statuses for DER2 and DER4 are as follows: DER2 is to inject 1 kVA, and DER4 is not used.

Table 804 depicts an optional sequence in which the DMS should cause the reclosers to transition to their respective updated new statuses and command the DERs to operate in accordance with their respective updated new statuses. The sequence shown in table 804 is similar to the sequence shown in table 604 of FIG. 6, but with updates reflecting the updates to the recloser and DER statuses in the updated reconfiguration (relative to the original reconfiguration).

At stage 1, the sequence includes opening R6 and R5 and commanding DER2 to inject 1 kVA to the power grid. Opening R6 can allow power to flow from energy source 502 to the loads downstream of closed recloser R1, i.e., loads L1, L2, L3, and L4, as well as to DER1. Similarly, opening R5 can allow power to flow from energy source 502 to the loads downstream of closed recloser R3, i.e., loads L7, L8, and L9, as well as to DER3, DER4, and DER5. Further, commanding DER2 to inject 1 kVA to the power grid serves to provide additional power to be supplied to all of the loads, albeit less additional power than that specified in the original reconfiguration, to supplement the reduction in power supplied to the loads due to the faults in feeders 504 and 506.

At stage 2, the sequence includes commanding DER1 to inject 6 kVA to assist with power supply to loads L3 and L4, and closing recloser R7 (as DER1 can now adequately serve L3 and L4). In addition, at stage 2, the sequence includes commanding DER5 to inject 5 kVA to assist with power supply to load L9.

Next, at stage 3, the sequence includes commanding DER3 to inject 7 kVA to assist with power supply to loads L1, L2, L7, and L8.

As discussed above with reference to the original reconfiguration shown in FIG. 6, the updated reconfiguration can also include additional data. For example, in addition to specifying updated new statuses for the reclosers, updated new statuses for the DERs, and a sequence for effecting the statuses changes, the updated reconfiguration can also include data specifying new statuses for other actuatable components of the power grid, and/or data specifying new parameter values at one or more nodes of the power grid (e.g., bus voltages).

XII. Example Method of Determining and Implementing a Reconfiguration

Figure 9:
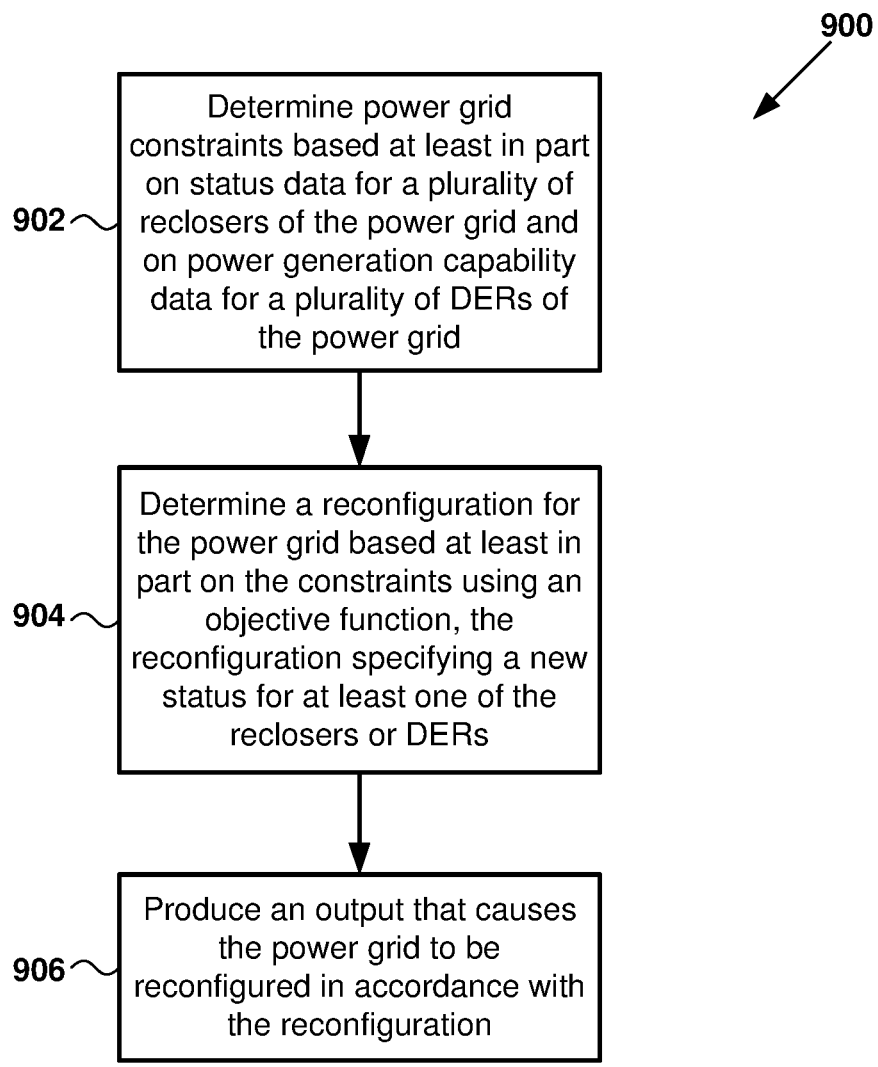
FIG. 9 illustrates an example method of determining and implementing a reconfiguration for a power grid specifying a new status for recloser(s) and/or DER(s) of the power grid, as can be performed in some examples of the disclosed technology.

FIG. 9 is a flow chart 900 outlining an example method of determining and implementing a reconfiguration for a power grid (or section thereof). For example, a DMS, such as DMS 300 of FIG. 3, can be used to perform the method outlined in FIG. 9.

At process block 902, power grid constraints are determined based on at least in part on status data for a plurality of reclosers of the power grid and on power generation capability data for a plurality of DERs of the power grid. Determination of power grid constraints is described in further detail in Section VI above.

At process block 904, a reconfiguration for the power grid is determined based at least in part on the constraints using an objective function (e.g., the objective function specified in equation (14) of Section VI above). The reconfiguration can specify a new status for at least one of the reclosers and/or DERs. One non-limiting example of reconfiguration is shown in FIG. 6 and described in Section IX above.

At process block 906, an output is produced that causes the power grid to be reconfigured in accordance with the reconfiguration. The output can include one or more signals that cause one or more components of the power grid (e.g., recloser(s) and/or DER(s) of the power grid) to change their status, for example.

XIII. Example Method of Determining a Reconfiguration

Figure 10:
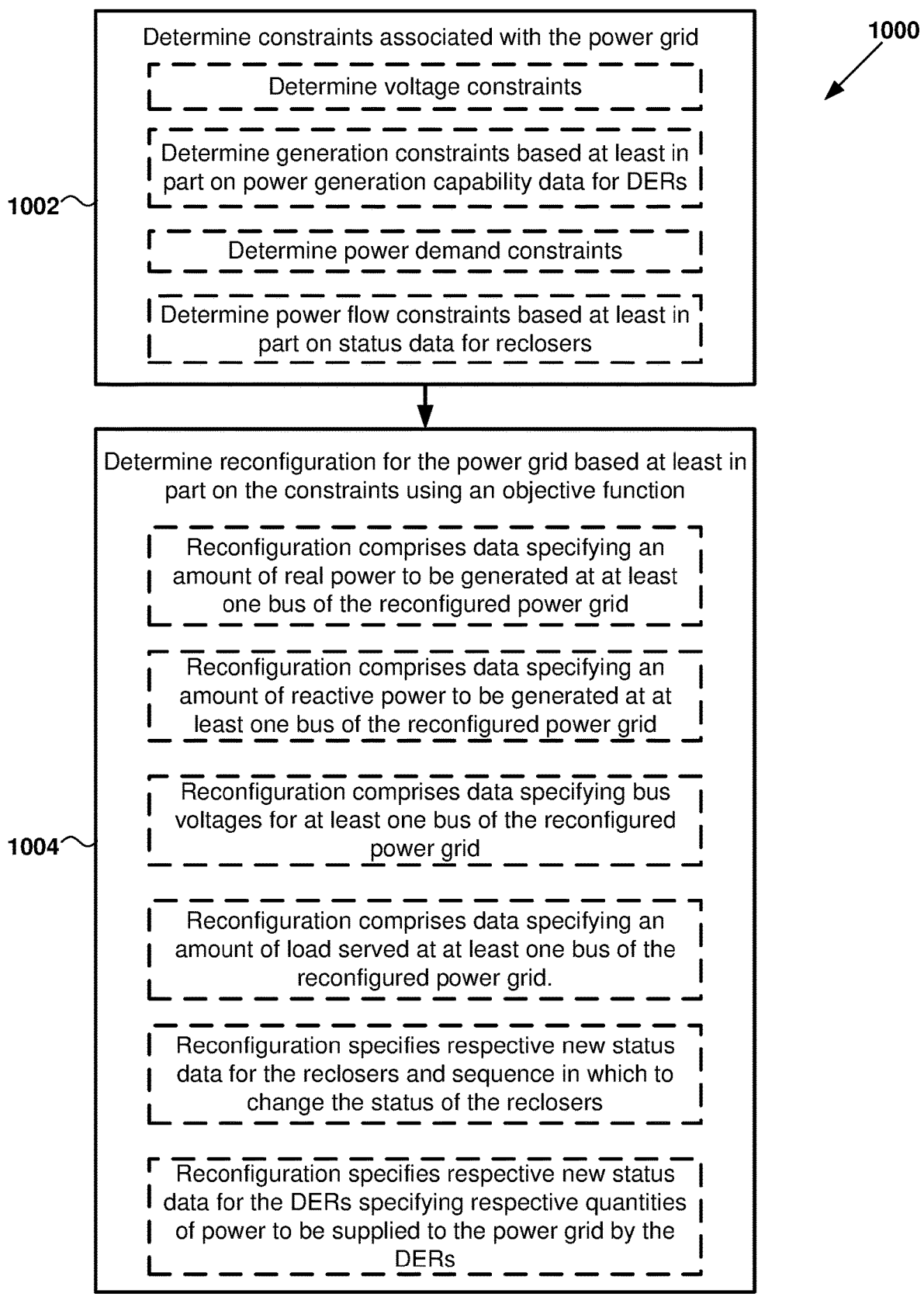
FIG. 10 illustrates an example method of determining a reconfiguration for a power grid, as can be performed in some examples of the disclosed technology.

FIG. 10 is a flow chart 1000 outlining an example method of determining a reconfiguration for a power grid (or section thereof). For example, a computer-implemented solver of a DMS, such as solver 308 of FIG. 3, can be used to perform the method outlined in FIG. 10.

At process block 1002, constraints associated with the power grid are determined. This optionally includes determining voltage constraints, determining generation constraints based at least in part on power generation capability data for DERs of the power grid, determining power demand constraints, and/or determining power flow constraints based at least in part on status data for reclosers of the power grid. The constraints determined at process block 1002 can include some or all of the constraints specified in equations (2)-(3) of Section VI above.

At process block 1004, a reconfiguration for the power grid is determined based at least in part on the constraints determine at process block 1002, using an objective function (e.g., the objective function described in equation (14) of Section VI above). The reconfiguration determined at process block 1004 can optionally include data specifying an amount of real power to be generated at at least one bus of the reconfigured power grid; data specifying an amount of reactive power to be generated at at least one bus of the reconfigured power grid; data specifying bus voltages for at least one bus of the reconfigured power grid; and/or data specifying an amount of load served at at least one bus of the reconfigured power grid. Further, the reconfiguration can optionally specify respective new status data for the reclosers and a sequence in which to change the status of the reclosers in accordance with the new status data. Still further, the reconfiguration can optionally specify respective new status data for the DERs specifying respective quantities of power to be supplied to the power grid by the DERs.

Figure 11:
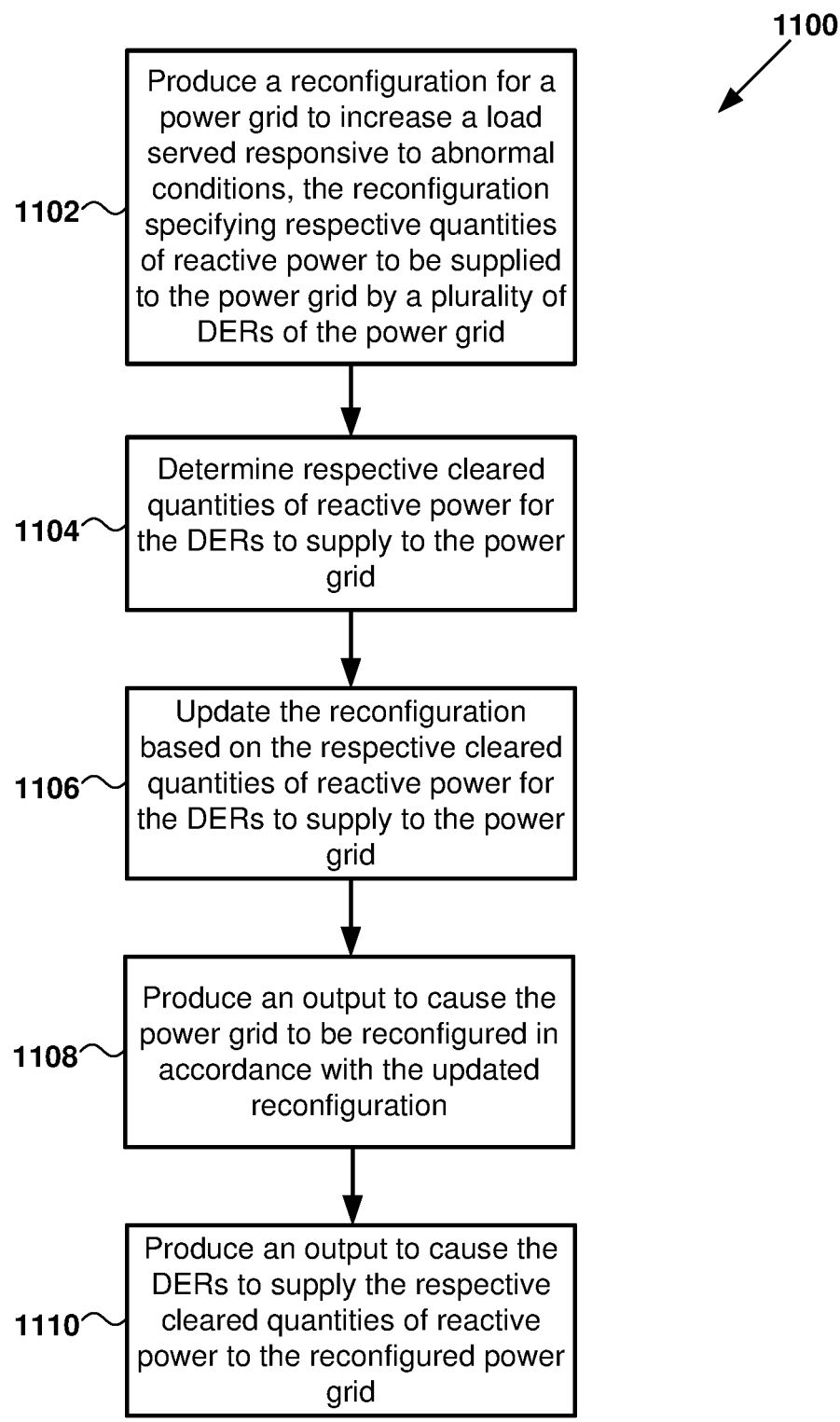
FIG. 11 illustrates an example method of determining and implementing a reconfiguration for a power grid specifying respective quantities of reactive power to be supplied to the power grid by a plurality of DERs, as can be performed in some examples of the disclosed technology.

XIV. Example Method of Determining and Implementing a Reconfiguration with DERs Supplying Reactive Power FIG. 11 is a flow chart 1100 outlining an example method of determining and implementing a reconfiguration for a power grid (or section thereof) in which the reconfiguration includes DERs supplying reactive power to the power grid. A DMS, such as DMS 300 of FIG. 3, can be used to perform the method outlined in FIG. 11, for example.

At process block 1102, a reconfiguration for a power grid is produced to increase a load served responsive to abnormal conditions, the reconfiguration specifying respective quantities of reactive power to be supplied to the power grid by a plurality of DERs of the power grid.

At process block 1104, respective cleared quantities of reactive power for the DERs to supply to the power grid are determined.

At process block 1106, the reconfiguration produced at process block 1102 is updated based on the respective cleared quantities of power for the DERs to supply to the power grid (i.e., the respective cleared quantities determined at process block 1104).

At process block 1108, an output is produced to cause the power grid to be reconfigured in accordance with the updated reconfiguration.

At process block 1110, an output is produced to cause the DERs to supply the respective cleared quantities of reactive power to the reconfigured power grid.

While flow chart 1100 refers to DERs supplying reactive power to the power grid, it will be appreciated that a similar method could be used to determine and implement a reconfiguration of a power grid or section thereof in which DERs are harnessed to provide real power, or apparent power, to the power grid.

Figure 12:
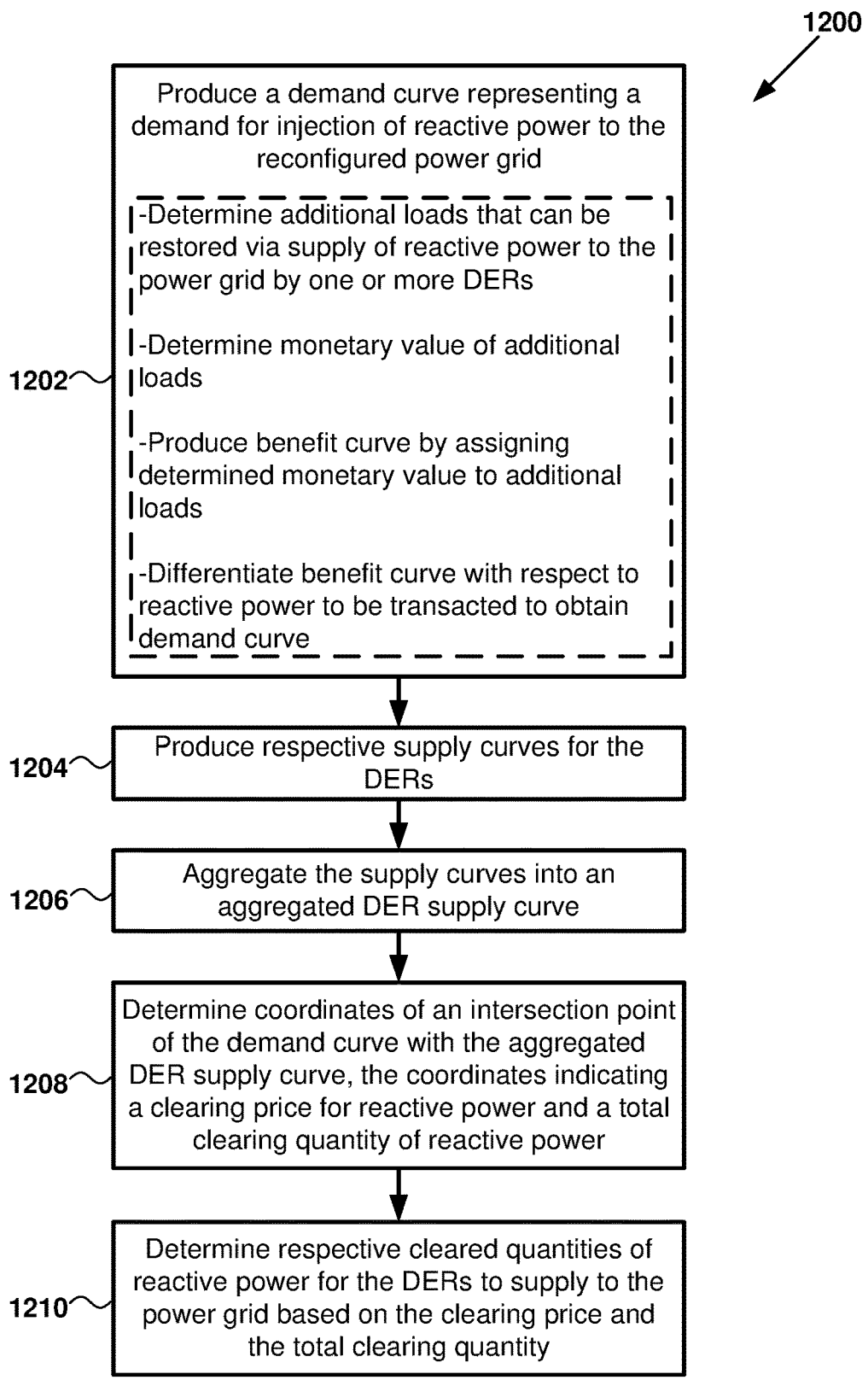
FIG. 12 illustrates an example method of determining respective cleared quantities of reactive power for the DERs to supply to the power grid, as can be performed in some examples of the disclosed technology.

XV. Example Method of Determining Cleared Quantities of Reactive Power to be Supplied by DERs FIG. 12 is a flow chart 1200 outlining an example method of determining cleared quantities of reactive power to be supplied by DERs to a power grid (or section thereof). A computer-implemented transactive controller of a DMS, such as transactive controller 316 of FIG. 3, can be used to perform the method outlined in FIG. 12, for example.

At process block 1202, a demand curve representing a demand for injection of reactive power to the reconfigured power grid is produced. As shown, producing the demand curve optionally includes determining additional loads that can be restored via supply of reactive power to the power grid by one or more DERs; determining a monetary value of the additional load; producing a benefit curve by assigning the determined monetary to the additional loads; and differentiating the benefit curve with respect to reactive power to be transacted to obtain the demand curve.

At process block 1204, respective supply curves for the DERs are produced, e.g. in the manner described in Section VII above with reference to FIG. 4.

At process block 1206, the supply curves produced at process block 1204 are aggregated into an aggregated DER supply curve. In some examples, the aggregation is performed by an entity other than the transactive controller of the DMS and the aggregated DER supply curve is provided as an input to the transactive controller. In other examples, the transactive controller itself performs the aggregation of the individual DER supply curves.

At process block 1208, coordinates of an intersection point of the demand curve with the aggregated DER supply curve are determined, the coordinates indicating a clearing price for reactive power and a total clearing quantity of reactive power. An example of such an intersection point is shown in FIG. 7.

At process block 1210, respective cleared quantities of reactive power for the DERs to supply to the power grid are determined based on the clearing price and total clearing quantity determined at process block 1208.

While flow chart 1200 refers to DERs supplying reactive power to the power grid, it will be appreciated that a similar method could be used to determine cleared quantities of real power or apparent power for the DERs to supply to the power grid.

Figure 13:
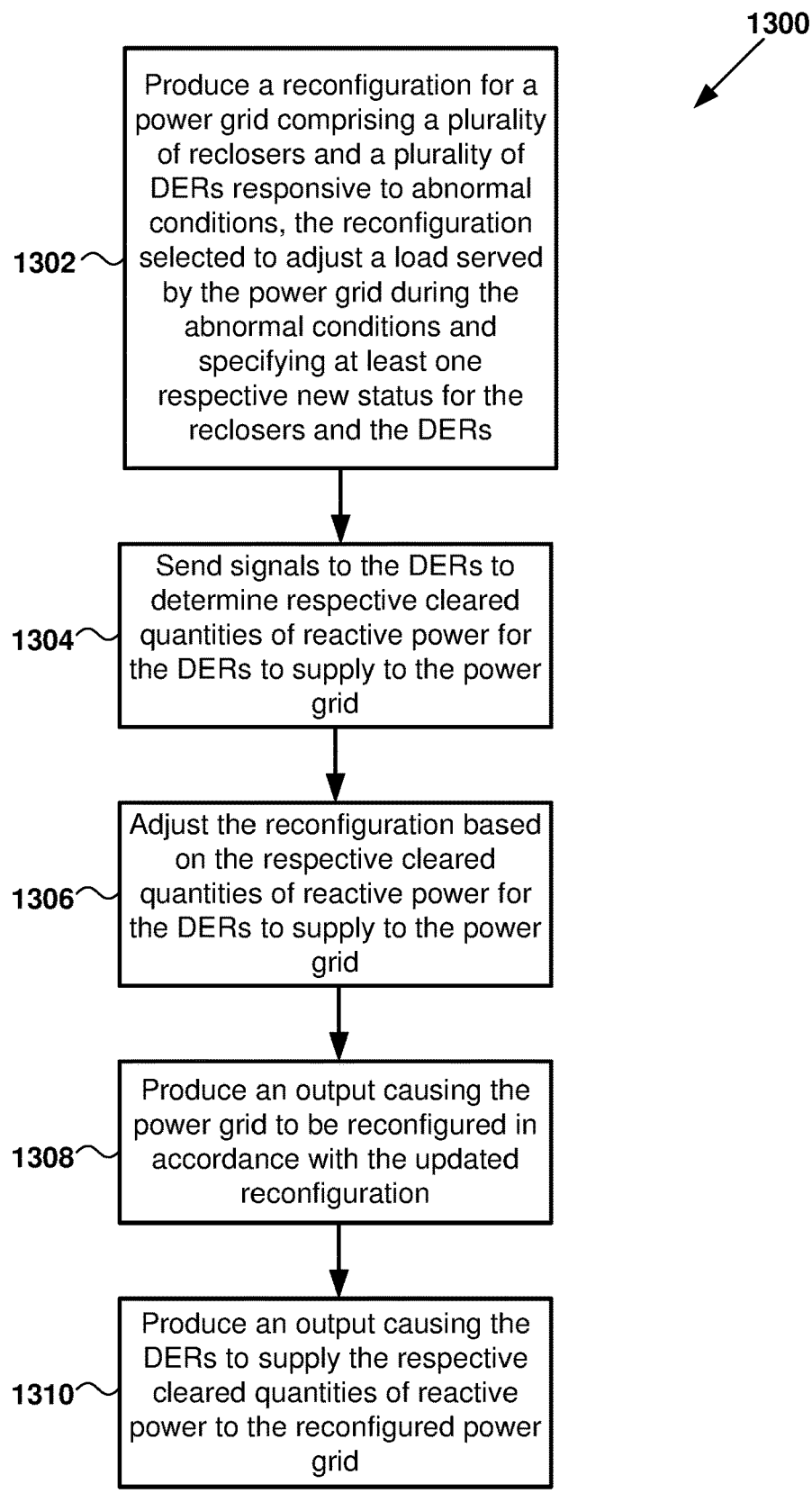
FIG. 13 illustrates an example method of determining, updating, and implementing a reconfiguration for a power grid, as can be performed in some examples of the disclosed technology.

XVI. Example Method of Determining, Updating, and Implementing a Reconfiguration FIG. 13 is a flow chart 1300 outlining an example method of determining, updating, and implementing a reconfiguration for a power grid (or section thereof). A DMS, such as DMS 300 of FIG. 3, can be used to perform the method outlined in FIG. 11, for example.

At process block 1302, a reconfiguration is produced responsive to abnormal conditions for a power grid comprising a plurality of reclosers and a plurality of DERs, the reconfiguration selected to adjust a load served by the power grid during the abnormal conditions and specifying at least one respective new status for the reclosers and the DERs.

At process block 1304, signals are sent to the DERs to determine respective cleared quantities of reactive power for the DERs to supply to the power grid.

At process block 1306, the reconfiguration is adjusted based on the respective cleared quantities determined at process block 1304 to produce an updated reconfiguration.

At process block 1308, an output is produced to cause the power grid to be reconfigured in accordance with the updated reconfiguration.

At process block 1310, an output is produced to cause the DERs to supply the respective cleared quantities of reactive power to the reconfigured power grid.

While flow chart 1300 refers to DERs supplying reactive power to the power grid, it will be appreciated that a similar method could be used to determine cleared quantities of real power or apparent power for the DERs to supply to the power grid.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. A method for restoring operation of a power grid comprising a plurality of distributed energy resources (DERs) responsive to abnormal conditions for the power grid, comprising:
   producing a reconfiguration for the power grid to increase a load served responsive to the abnormal conditions, the reconfiguration specifying respective quantities of reactive power to be supplied to the power grid by the DERs;
   determining respective cleared quantities of reactive power for the DERs to supply to the power grid, the determining comprising, with a computer-implemented transactive controller:
      producing a demand curve representing a demand for injection of reactive power to the reconfigured power grid, the producing a demand curve comprising: (1) determining additional loads that can be restored via supply of reactive power to the power grid by the DERs, (2) determining a monetary value of the additional loads, (3) producing a benefit curve by assigning the determined monetary value to the additional loads, and (4) differentiating the benefit curve with respect to reactive power to be transacted to obtain the demand curve,
      producing respective supply curves for the DERs and aggregating the supply curves into an aggregated DER supply curve,
      determining coordinates of an intersection point of the demand curve with the aggregated DER supply curve, the coordinates indicating a clearing price for reactive power and a total clearing quantity of reactive power, and
      determining the respective cleared quantities of reactive power for the DERs to supply to the power grid based on the clearing price and the total clearing quantity;
   updating the reconfiguration based on the respective cleared quantities of reactive power for the DERs to supply to the power grid;
   producing an output to cause the power grid to be reconfigured in accordance with the updated reconfiguration; and
   producing an output to cause the DERs to supply the respective cleared quantities of reactive power to the reconfigured power grid,
   wherein the power grid further comprises a plurality of reclosers, wherein the determination of the reconfiguration is performed by a computer-implemented solver based at least in part on current open or closed statuses of the reclosers and reactive power generation capabilities of the DERs, and wherein the reconfiguration specifies respective new statuses for the reclosers.

2. The method of claim 1, wherein the determination of the monetary value of the additional loads is based at least in part on a on loss of energy revenue due to not being able to serve the additional loads, a cost of Energy Not Served (ENS), and a cost of Demand Not Served (DES).

3. The method of claim 1, wherein producing the respective supply curves for the DERs comprises, for each DER, producing a supply curve based at least in part on an operating point of the DER, a degradation cost representing wear and tear, power losses associated with operation of the DER, and a cost of active power curtailments associated with generation of reactive power by the DER.

4. The method of claim 1, wherein the updated reconfiguration specifies updates to the respective new statuses for one or more of the reclosers, and wherein the output to cause the power grid to be reconfigured in accordance with the updated reconfiguration causes the current statuses of the reclosers to be changed to the respective new statuses as updated in the updated reconfiguration.

5. An apparatus comprising:
   a processor; and
   a non-transitory computer-readable storage medium storing computer-readable instruction that, when executed by the processor, cause the apparatus to perform a method, the instructions comprising:
   instructions that cause the apparatus to produce a reconfiguration for a power grid responsive to abnormal conditions for the power grid, the power grid comprising a plurality of controllable reclosers and a plurality of distributed energy resources (DERs), and the reconfiguration being selected by the processor to adjust a load served by the power grid during the abnormal conditions and specifying at least one respective new status for one or more of the controllable reclosers and the DERs, the controllable reclosers being controllable to both selectively open or selectively close;

instructions that cause the apparatus to send signals to the DERs to determine respective cleared quantities of reactive power for the DERs to supply to the power grid; instructions that cause the apparatus to produce an updated reconfiguration for at least the controllable reclosers by adjusting the reconfiguration based on the respective cleared quantities of reactive power for the DERs to supply to the power grid;

instructions that cause the apparatus to produce an output causing the power grid, including the controllable reclosers, to be reconfigured in accordance with the updated reconfiguration; and instructions that cause the apparatus to produce an output causing the DERs to supply the respective cleared quantities of reactive power to the reconfigured power grid, wherein producing a reconfiguration for the power grid comprises generating a sequence which causes the plurality of controllable reclosers to transition to the respective new statuses.

6. A system for operating a power grid, comprising:
a power grid operated by a utility, the power grid comprising the plurality of controllable reclosers and the plurality of DERs; and
the apparatus of claim 5.

7. The apparatus of claim 5,
wherein the respective new statuses for the controllable reclosers specify whether to open or close the reclosers, and wherein the respective new statuses for the DERs specify respective quantities of reactive power to be supplied to the power grid by the DERs.

8. The apparatus of claim 5, further comprising:
means for producing the reconfiguration for the power grid.

9. The apparatus of claim 5, wherein the production of the reconfiguration is based at least in part on constraints associated with the power grid and an objective function, and wherein the constraints are determined based at least in part on current statuses of the reclosers and reactive power generation capabilities of the DERs.

10. The apparatus of claim 5, wherein adjusting the reconfiguration based on the respective cleared quantities of reactive power for the DERs to supply to the power grid comprises modifying at least some of the respective new statuses for the reclosers specified in the reconfiguration based on differences between the respective quantities of reactive power to be supplied to the power grid by the DERs specified in the reconfiguration and the respective cleared quantities of reactive power for the DERs to supply to the power grid.

11. The apparatus of claim 5, wherein determining respective cleared quantities of reactive power for the DERs to supply to the power grid comprises:
producing a demand curve representing a demand for injection of reactive power to the reconfigured power grid;
obtaining respective supply curves for the DERs and aggregating the supply curves into an aggregated DER supply curve; and
determining coordinates of an intersection point of the demand curve with the aggregated DER supply curve, the coordinates indicating a clearing price for reactive power and a total clearing quantity of reactive power; and determining the respective cleared quantities of reactive power for the DERs to supply to the power grid based on the clearing price and the total clearing quantity.

12. A non-transitory computer-readable storage medium storing computer-readable instructions that when executed by a computer, cause the computer to perform a method for restoring operation of a power grid comprising a plurality of distributed energy resources (DERs) responsive to abnormal conditions for the power grid, the method comprising:
producing a reconfiguration for the power grid to increase a load served responsive to the abnormal conditions, the reconfiguration specifying respective quantities of reactive power to be supplied to the power grid by the DERs;
determining respective cleared quantities of reactive power for the DERs to supply to the power grid, the determining comprising, with a computer-implemented transactive controller:
producing a demand curve representing a demand for injection of reactive power to the reconfigured power grid, the producing a demand curve comprising: (1) determining additional loads that can be restored via supply of reactive power to the power grid by the DERs, (2) determining a monetary value of the additional loads, (3) producing a benefit curve by assigning the determined monetary value to the additional loads, and (4) differentiating the benefit curve with respect to reactive power to be transacted to obtain the demand curve,
producing respective supply curves for the DERs and aggregating the supply curves into an aggregated DER supply curve, determining coordinates of an intersection point of the demand curve with the aggregated DER supply curve, the coordinates indicating a clearing price for reactive power and a total clearing quantity of reactive power, and determining the respective cleared quantities of reactive power for the DERs to supply to the power grid based on the clearing price and the total clearing quantity;
updating the reconfiguration based on the respective cleared quantities of reactive power for the DERs to supply to the power grid;
producing an output to cause the power grid to be reconfigured in accordance with the updated reconfiguration; and
producing an output to cause the DERs to supply the respective cleared quantities of reactive power to the reconfigured power grid,
wherein the power grid further comprises a plurality of reclosers, wherein the determination of the reconfiguration is performed by a computer-implemented solver based at least in part on current open or closed statuses of the reclosers and reactive power generation capabilities of the DERs, and wherein the reconfiguration specifies respective new statuses for the reclosers.

13. The non-transitory computer-readable storage medium of claim 12, wherein the determination of the monetary value of the additional loads is based at least in part on a loss of energy revenue due to not being able to serve the additional loads, a cost of Energy Not Served (ENS), and a cost of Demand Not Served (DES).

14. The non-transitory computer-readable storage medium of claim 12, wherein producing the respective supply curves for the DERs comprises, for each DER, producing a supply curve based at least in part on an operating point of the DER, a degradation cost representing wear and tear, power losses associated with operation of the DER, and a cost of active power curtailments associated with generation of reactive power by the DER.

15. The non-transitory computer-readable storage medium of claim 12, wherein the updated reconfiguration specifies updates to the respective new statuses for one or more of the reclosers, and wherein the output to cause the power grid to be reconfigured in accordance with the updated reconfiguration causes the current statuses of the reclosers to be changed to the respective new statuses as updated in the updated reconfiguration.

16. An apparatus comprising: a processor; and a non-transitory computer-readable storage medium storing computer-readable instructions that, when executed by the processor, cause the apparatus to perform a method for restoring operation of a power grid comprising a plurality of distributed energy resources (DERs) responsive to abnormal conditions for the power grid, the instructions comprising:

instructions that cause the apparatus to, with the processor, produce a reconfiguration for the power grid to increase a load served responsive to the abnormal conditions, the reconfiguration specifying respective quantities of reactive power to be supplied to the power grid by the DERs;

instructions that cause the apparatus to, with the processor, determine respective cleared quantities of reactive power for the DERs to supply to the power grid, the determining comprising, with a computer-implemented transactive controller:

producing a demand curve representing a demand for injection of reactive power to the reconfigured power grid, the producing a demand curve comprising: (1) determining additional loads that can be restored via supply of reactive power to the power grid by the DERs, (2) determining a monetary value of the additional loads, (3) producing a benefit curve by assigning the determined monetary value to the additional loads, and (4) differentiating the benefit curve with respect to reactive power to be transacted to obtain the demand curve, producing respective supply curves for the DERs and aggregating the supply curves into an aggregated DER supply curve, determining coordinates of an intersection point of the demand curve with the aggregated DER supply curve, the coordinates indicating a clearing price for reactive power and a total clearing quantity of reactive power, and determining the respective cleared quantities of reactive power for the DERs to supply to the power grid based on the clearing price and the total clearing quantity;

instructions that cause the apparatus to, with the processor, update the reconfiguration based on the respective cleared quantities of reactive power for the DERs to supply to the power grid;

instructions that cause the apparatus to, with the processor, produce an output to cause the power grid to be reconfigured in accordance with the updated reconfiguration; and instructions that cause the apparatus to, with the processor, produce an output to cause the DERs to supply the respective cleared quantities of reactive power to the reconfigured power grid, wherein the power grid further comprises a plurality of reclosers, wherein the determination of the reconfiguration is performed by a computer-implemented solver based at least in part on current open or closed statuses of the reclosers and reactive power generation capabilities of the DERs, and wherein the reconfiguration specifies respective new statuses for the reclosers.

17. The apparatus of claim 16, wherein the determination of the monetary value of the additional loads is based at least in part on a on loss of energy revenue due to not being able to serve the additional loads, a cost of Energy Not Served (ENS), and a cost of Demand Not Served (DES).

18. The apparatus of claim 16, wherein producing the respective supply curves for the DERs comprises, for each DER, producing a supply curve based at least in part on an operating point of the DER, a degradation cost representing wear and tear, power losses associated with operation of the DER, and a cost of active power curtailments associated with generation of reactive power by the DER.

19. The apparatus of claim 16, wherein the updated reconfiguration specifies updates to the respective new statuses for one or more of the reclosers, and wherein the output to cause the power grid to be reconfigured in accordance with the updated reconfiguration causes the current statuses of the reclosers to be changed to the respective new statuses as updated in the updated reconfiguration.

\* \* \* \* \*

UNITED STATES PATENT AND TRADEMARK OFFICE
CERTIFICATE OF CORRECTION

PATENT NO. : 11,451,061 B2
APPLICATION NO. : 16/673781
DATED : September 20, 2022
INVENTOR(S) : Radhakrishnan et al.

Page 1 of 1

It is certified that error appears in the above-identified patent and that said Letters Patent is hereby corrected as shown below:

In the Specification

Column 10,
Line 19, "to be operate within" should be --to be operated within--.

Column 15,
Line 18, "data such new statuses" should be --data such as new statuses--.
Line 50, "determine, updated" should be --determine, update--.
Lines 60-61, "reconfiguration and provided" should be --reconfiguration are provided--.

In the Claims

Column 24,
Line 36, "on a on loss of" should be --on a loss of--.

Column 28,
Line 27, "on a on loss of" should be --on a loss of--.

Signed and Sealed this
Seventeenth Day of October, 2023

Katherine Kelly Vidal
*Director of the United States Patent and Trademark Office*